(12) United States Patent
Sakai et al.

(10) Patent No.: US 8,189,147 B2
(45) Date of Patent: May 29, 2012

(54) LIQUID CRYSTAL DISPLAY DEVICE

(75) Inventors: Takehiko Sakai, Osaka (JP); Dai Chiba, Osaka (JP); Katsuhiko Morishita, Osaka (JP); Yoshiharu Kataoka, Osaka (JP); Chikanori Tsukamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 172 days.

(21) Appl. No.: 12/674,032

(22) PCT Filed: May 23, 2008

(86) PCT No.: PCT/JP2008/059587
§ 371 (c)(1),
(2), (4) Date: Feb. 18, 2010

(87) PCT Pub. No.: WO2009/050912
PCT Pub. Date: Apr. 23, 2009

(65) Prior Publication Data
US 2011/0025962 A1    Feb. 3, 2011

(30) Foreign Application Priority Data

Oct. 18, 2007 (JP) ................................ 2007-271697

(51) Int. Cl.
*G02F 1/1335* (2006.01)
(52) U.S. Cl. .......................................... 349/117; 349/96
(58) Field of Classification Search .......... 349/113–114, 349/117–119, 96–98
See application file for complete search history.

(56) References Cited

U.S. PATENT DOCUMENTS

| | | | |
|---|---|---|---|
| 6,433,845 B1 | 8/2002 | Suzuki et al. | |
| 7,230,663 B1 | 6/2007 | Wu et al. | |
| 7,932,975 B2 * | 4/2011 | Sakai et al. | 349/113 |
| 2004/0252258 A1 | 12/2004 | Matsushima | |
| 2006/0103782 A1 | 5/2006 | Adachi et al. | |
| 2006/0146105 A1 | 7/2006 | Hayashi | |
| 2007/0036917 A1 | 2/2007 | Hirakata | |

FOREIGN PATENT DOCUMENTS

| | | |
|---|---|---|
| EP | 1 679 545 | 7/2006 |
| JP | 10-268251 | 10/1998 |
| JP | 11-174489 | 7/1999 |

(Continued)

OTHER PUBLICATIONS

Notice of Allowance mailed Dec. 23, 2010 in U.S. Appl. No. 12/303,826.

(Continued)

*Primary Examiner* — Dung T. Nguyen
(74) *Attorney, Agent, or Firm* — Nixon & Vanderhye, P.C.

(57) ABSTRACT

A negative C plate (31) is arranged to be between a polarizing plate (32) and a reflective liquid crystal panel (20). A retardation of the negative C plate (31) is set so that a combination of the negative C plate (31) and the liquid crystal panel (20) generates a phase difference of "$n\lambda/4+\lambda/8$ (n is 0, or a positive or negative integer)" for a one-way light path with respect to linearly-polarized light entering into the liquid crystal display device. This makes it possible to provide, at low cost, a liquid crystal display device whose viewing angle can be narrowed by arbitrarily setting a direction in which visibility is limited.

8 Claims, 23 Drawing Sheets

FOREIGN PATENT DOCUMENTS

| | | |
|---|---|---|
| JP | 2000-137294 | 5/2000 |
| JP | 2003-337336 | 11/2003 |
| JP | 2004-333830 | 11/2004 |
| JP | 2004-361917 | 12/2004 |
| JP | 2006-139160 | 6/2006 |
| JP | 2007-47696 | 2/2007 |
| JP | 2007-047697 | 2/2007 |

OTHER PUBLICATIONS

International Search Report for PCT/JP2008/059587, mailed Aug. 19, 2008.

U.S. Appl. No. 12/303,826, Sakai, filed Dec. 8, 2008.

* cited by examiner

FIG. 7
(a)
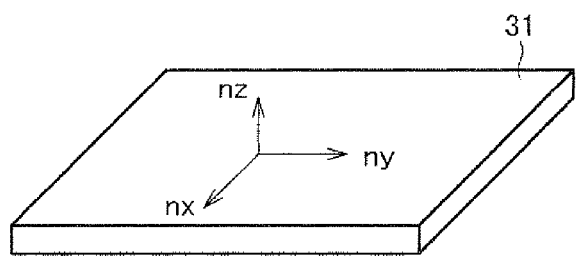
(b)  $nx = ny > nz$
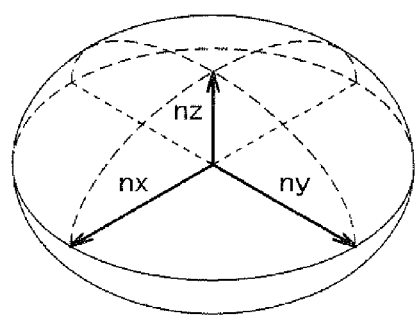

FIG. 18
(a) $n_X > n_Y = n_Z$
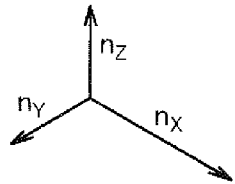
(b) $n_Z = n_X > n_Y$
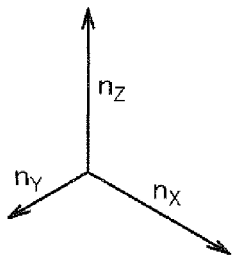
(c) $n_X > n_Y > n_Z$
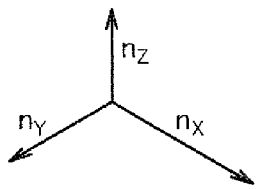
(d) $n_X > n_Z > n_Y$
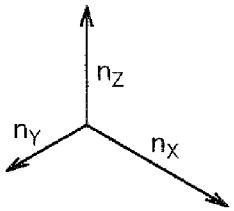
(e) $n_Z > n_X > n_Y$
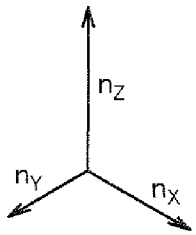

FIG. 19

| APPLICATION OF VOLTAGE | | INCIDENT LIGHT PATH (INWARD ROUTE) | | | EXIT LIGHT PATH (OUTWARD ROUTE) | | | RESULT |
|---|---|---|---|---|---|---|---|---|
| | | POLARIZING PLATE | NEGA C | λ/4 | LIQUID CRYSTAL CELL | λ/4 | NEGA C | POLARIZING PLATE | |
| FRONT DIRECTION | ON | ↙ | ↙ 0 | ○ λ/4 | ○ λ/2 | ↘ λ/4 | ↘ 0 | ↘ | WHITE λ |
| | OFF | ↙ | ↙ 0 | ○ λ/4 | ○ 0 | ↗ λ/4 | ↗ 0 | ↗ | BLACK λ/2 |
| OBLIQUE DIRECTION | ON | ↙ | ⬭ λ/8 | ⬭ λ/4 | ○ λ/2 | ⬭ λ/4 | ○ λ/8 | ○ | GRAY (BLACK) 5λ/4 |
| | OFF | ↙ | ⬭ λ/8 | ⬭ λ/4 | ○ 0 | ⬭ λ/4 | ○ λ/8 | ○ | GRAY (BLACK) 3λ/4 |

FIG. 20

| APPLICATION OF VOLTAGE | | LIGHT PATH | | | | | RESULT |
|---|---|---|---|---|---|---|---|
| | | (LIGHT INCIDENT SIDE) SECOND POLARIZING PLATE | SECOND NEGA C | LIQUID CRYSTAL CELL | FIRST NEGA C | (LIGHT EXIT SIDE) FIRST POLARIZING PLATE | |
| FRONT DIRECTION | ON | ↗ | ↗ 0 | ↗ $\lambda/2$ | ↗ 0 | ↗ | BLACK |
| | OFF | ↗ | ↗ 0 | ↗ 0 | ↗ 0 | ↗ | WHITE |
| OBLIQUE DIRECTION (FIG. 21) | ON | ↗ | ⬭ $\lambda/8$ | ⬭ $\lambda/2$ | ○ | ○ | GRAY (BLACK) $3\lambda/4$ |
| | OFF | ↗ | ⬭ $\lambda/8$ | ⬭ 0 | ○ $\lambda/8$ | ○ | GRAY (BLACK) $\lambda/4$ |
| OBLIQUE DIRECTION (FIG. 22) | ON | ↗ | ○ $\lambda/4$ | ○ $\lambda/2$ | ↑ | ○ | GRAY (BLACK) $3\lambda/4$ |
| | OFF | ↗ | ○ $\lambda/4$ | ○ 0 | ↑ | ○ | GRAY (BLACK) $\lambda/4$ |

LIQUID CRYSTAL DISPLAY DEVICE

This application is the U.S. national phase of international Application No. PCT/JP2008/059587, filed 23 May 2008, which designated the U.S. and claims priority to Japanese Patent Application No, 2007-271697, filed Oct. 18, 2007, the entire contents of each of which are hereby incorporated by reference.

TECHNICAL FIELD

The technology disclosed herein relates to a liquid crystal display device which controls a viewing angle of a display panel.

BACKGROUND ART

Generally, a display device is required to have a viewing angle as wide as possible so that a viewer can view displayed images clearly from any viewing point. In order to achieve such a wide viewing angle, various technical development has been undertaken, particularly, a liquid crystal display device, which has been widely used recently. This is because the liquid crystal display device employs liquid crystal which itself has a viewing angle characteristic.

However, in some environments a user wishes to privately look at content displayed on a display screen. In such a case, it is preferable that the viewing angle be narrow. Such may be the case for a user who uses an electronics device, such as a laptop personal computer, a mobile terminal (PDA: Personal Digital Assistant), or a mobile phone, in a place where other people are near the user, such as on a train, or on a plane. In such environments, the user wishes to prevent other people near the user from seeing the displayed content in view of preservation of confidentiality, privacy protection, and the like. Therefore, in those cases it is preferable that the display device has a narrow viewing angle. For this reason, recently there has been growing demand for a display device whose viewing angle can be switched between a wide viewing angle and a narrow viewing angle in accordance with an environment in which the user uses the display device. Not only is this demanded for the liquid crystal display device, but is also demanded for any liquid crystal display device in common.

In response to such demand, the following Patent Literature 1 discloses a technique of changing a viewing angle characteristic of a display device by (i) providing a display device for displaying images with a phase difference control device, and (ii) controlling a voltage applied to the phase difference control device, for example. Patent Literature 1 describes that the liquid crystal display device functioning as the phase difference control device may employ, as the liquid crystal mode, chiral nematic liquid crystal, homogeneous liquid crystal, or nematic liquid crystal in random alignment, for example.

Patent Literature 1 describes that a switchover between the wide viewing angle and the narrow viewing angle can be realized by using the liquid crystal display device for phase difference control. However, the switchover between the wide viewing angle and the narrow viewing angle is not absolutely necessary.

The switchover of the viewing angle requires the display device to have a more complicated arrangement, and also requires an increase in cost. In consideration of a reduction in cost of manufacture of the display device, there has been demand for a display device which does not have a function of the switchover of the viewing angle but is capable of narrowing its viewing angle.

The following Patent Literature 2 discloses a technique of narrowing a viewing angle of a display device which does not have the function of the switchover between the wide viewing angle and the narrow viewing angle. Patent Literature 2 discloses a viewing angel control sheet which takes the place of the phase difference control device having the function of the switchover of the viewing angle. As illustrated in FIG. 23, a louver film 102, which functions as the viewing angle control sheet, is stacked on an upper surface of a liquid crystal panel 101 having a liquid crystal cell 111 containing TN (Twisted Nematic) liquid crystal. As illustrated in FIG. 24, this louver film 102 includes: base material sections 121, which are made of a transparent material; and light absorbing walls 122, which are made of a light absorbing material and are arranged in a louver pattern. The light absorbing walls 122 made of the light absorbing material are lower in refractive index than the base material sections 121 made of the transparent material. The louver film 102 prevents light that enters into the louver film 102 at an angle not less than a specific incident angle from being emitted from the louver film 102. Therefore, it is possible to realize the viewing angle control sheet having an effect of preventing other people from seeing the displayed content.

Recently, this louver film disclosed in Patent Literature 2 has been mainly used in a viewing angle control panel without the switchover of the viewing angle.

The louver film disclosed in Patent Literature 2, however, can limit visibility only in oblique directions, opposite to each other, toward a light receiving surface of the light absorbing wall 122. In other words, the louver film has a problem that it is impossible to arbitrarily set a direction in which the visibility is limited.

Further, the louver film has another problem of high cost due to such a periodical structure that the light transparent material and the light absorbing material are arranged alternatively.

In consideration of the aforementioned problems of the louver film, Patent Literature 3 discloses a viewing angle limiting element which has another arrangement in place of the above louver film.

This viewing angle limiting element has such an arrangement that (i) a liquid crystal layer in which liquid crystal molecules have hybrid alignment is sandwiched between a first polarizing layer and a second polarizing layer, and (ii) an absorption axis of the first polarizing layer and an absorption axis of the second polarizing layer are parallel to each other. The liquid crystal layer employs a discotic nematic mode.

This arrangement causes the liquid crystal layer in which the liquid crystal molecules have the hybrid alignment to generate a phase difference with respect to linearly-polarized light traveling in an oblique direction from the second polarizing layer toward the liquid crystal layer, so that a polarization state of the linearly-polarized light is changed. Because of this, the linearly-polarized light is absorbed by the first polarizing layer, so that a transmissivity of the linearly-polarized light is reduced.

CITATION LIST

Patent Literature 1

Japanese Patent Application Publication, Tokukaihei, No. 11-174489 A (1999) (Publication Date: Jul. 2, 1999)

Patent Literature 2

Japanese Patent Application Publication, Tokukai, No. 2000-137294 A (Publication Date: May 16, 2000)

Patent Literature 3

Japanese Patent Application Publication, Tokukai, No. 2006-139160 A (Publication Date: Jun. 1, 2006)

The viewing angle limiting element disclosed in Patent Literature 3 essentially requires a multilayer arrangement. Therefore, if the viewing angle limiting element is provided to a display device, there arises a problem of a reduction in transmissivity of the display device. The inevitability of the multilayer arrangement is due to the way that the viewing angle limiting element limits the viewing angle. That is, in the method of Patent Literature 3, (i) the first polarizing layer temporarily converts light into the linearly-polarized light, (ii) the liquid crystal layer changes the polarization state of the linearly-polarized light, and then (iii) the second polarizing layer absorbs the polarized light whose polarization state has been changed. Therefore, all of the layers are essential in the method of Patent Literature 3.

Further, such a multilayer arrangement causes an increase in cost of manufacture of the display device.

The technology disclosed herein is made in view of the conventional problems described above.

SUMMARY

The technology disclosed herein provides a liquid crystal display device whose viewing angle can be narrowed with a simple arrangement by arbitrarily setting a direction in which visibility is limited.

A liquid crystal display device according to the technology disclosed herein includes: a liquid crystal panel of a reflective-type; a polarizing plate provided on a light incident side of the liquid crystal panel; and a phase difference member provided between the liquid crystal panel and the polarizing plate, the phase difference member having a retardation and being set such that the retardation for such a light path that a display surface of the liquid crystal panel is viewed in a direction at a specific polar angle $\Phi k$ ($0° < \Phi k < 90°$) determines a direction in which visibility is limited.

"The phase difference member having a retardation and being set such that the retardation for such a light path that a display surface of the liquid crystal panel is viewed in a direction at a specific polar angle $\Phi k$ ($0° < \Phi k < 90°$) determines a direction in which visibility is limited" described above can be replaced with "the phase difference member whose retardation is set so as to limit visibility in a case where a display surface of the liquid crystal panel is viewed in a direction at a specific polar angle $\Phi k$ ($0° < \Phi k < 90°$)".

With the arrangement, the phase difference member whose retardation is set to determine the direction in which the visibility is limited is provided between the liquid crystal panel of the reflective-type and the polarizing plate.

Linearly-polarized light which has passed through the single polarizing plate provided on a light incident side of the liquid crystal panel enters into the phase difference member and the liquid crystal panel, and then is reflected inside the liquid crystal panel. After that, the light thus reflected passes through the phase difference member again, and returns to the polarizing plate. At this point, the phase difference member limits the exit of the light which returns to the polarizing plate in the light path in a case where the liquid crystal panel is viewed in the direction at the specific polar angle $\Phi k$ ($0° < \Phi k < 90°$).

The following explains how to set the retardation of the phase difference member in view of the principle of the optical effect. In short, the retardation may be set so that, either in a period during which the liquid crystal panel is driven to display images, or in a period during which the liquid crystal panel is not driven to display images (in other words, either in a case where liquid crystal molecules stand perpendicular to the substrate, or in a case where the liquid crystal molecules lie parallel to the substrate), the linearly-polarized light entering into the polarizing plate at the specific polar angle $\Phi k$ (i) is converted into polarized light having a polarization component parallel to the absorption axis of the polarizing plate at the same proportion in both a period during which white is displayed, and a period during which black is displayed, and (ii) returns to the polarizing plate.

With this setting, the polarization component parallel to the absorption axis is absorbed at the same proportion in both the period during which white is displayed, and in the period during which black is displayed, so that the same brightness with no contrast difference (gray) is displayed. Therefore, it becomes hard for a viewer to recognize the displayed content. That is, for the viewer viewing the display surface at the specific polar angle $\Phi k$, gray is always displayed over the display surface, so that the visibility is limited.

Further, it is possible to change the value of the polar angle $\Phi k$ by changing the retardation.

Accordingly, with the arrangement, the phase plate whose retardation is set as described above is merely added. Therefore, it is possible to provide a liquid crystal display device of a reflective-type, whose viewing angle can be narrowed with the simple arrangement by arbitrarily setting the direction in which the visibility is limited.

In an example embodiment a liquid crystal display device includes: a liquid crystal panel of a transmissive-type; a first polarizing plate provided on a light incident side of the liquid crystal panel; a second polarizing plate provided on a light exit side of the liquid crystal panel; and a phase difference member provided in at least one of (i) a position between the liquid crystal panel and the first polarizing plate, and (ii) a position between the liquid crystal panel and the second polarizing plate, the phase difference member having a retardation and being set such that the retardation for such a light path that a display surface of the liquid crystal panel is viewed in a direction at a specific polar angle $\Phi k$ ($0° < \Phi k < 90°$) determines a direction in which visibility is limited.

"The phase difference member having a retardation and being set such that the retardation for such a light path that a display surface of the liquid crystal panel is viewed in a direction at a specific polar angle $\Phi k$ ($0° < \Phi k < 90°$) determines a direction in which visibility is limited" can be replaced with "the phase difference member whose retardation is set so as to limit visibility in a case where a display surface of the liquid crystal panel is viewed in a direction at a specific polar angle $\Phi k$ ($0° < \Phi k < 90°$)".

Regardless of whether the liquid crystal panel is the transmissive-type or the reflective-type, the principle of the optical effect of the phase difference member in the above arrangement is the same. That is, for example, the retardation may be set so that, either in the case where the liquid crystal molecules stand perpendicular to the substrate, or in the case where the liquid crystal molecules lie parallel to the substrate, the linearly-polarized light entering into the second polarizing plate at the specific polar angle $\Phi k$ is converted into the polarized light having the polarization component parallel to the absorption axis of the polarizing plate at the same proportion, and is lead to the first polarizing plate.

Further, it is possible to change the value of the polar angle $\Phi k$ by changing the retardation.

Accordingly, with the arrangement, the phase plate whose retardation is set as described above is merely added. Therefore, it is possible to provide a transmissive liquid crystal display device whose viewing angle can be narrowed with the simple arrangement by arbitrarily setting a direction in which the visibility is limited.

In the case where the display surface of the liquid crystal panel is viewed in the direction at the specific polar angle $\Phi k$ ($0°<\Phi k<90°$), a combination of the phase difference member and the liquid crystal panel preferably generates a phase difference of $n\lambda/2+\lambda/4$ (where n is 0, or a positive or negative integer) in total through the light path from entry of light into the liquid crystal display device to exit of the light from the liquid crystal display device.

With the arrangement, in the case of the liquid crystal panel of the reflective-type, the combination of the phase difference member and the liquid crystal panel gives the polarized light which passed through the polarizing plate, the phase difference of $n\lambda/2+\lambda/4$ (where n is 0, or a positive or negative integer) in total through the light path from the entry of the light into the liquid crystal display device to the exit of the light from the liquid crystal display device.

More specifically, in a case where n is 0, the linearly-polarized light is given the phase difference of "$\lambda/4$". In this case, the linearly-polarized light is converted into the circularly-polarized light, and returns to the polarizing plate. Since the polarizing plate absorbs the polarization component parallel to its absorption axis, the polarizing plate emits such linearly-polarized light that the light amount of the circularly-polarized light is reduced. This reduction in light amount is the same in both the period during which white is displayed, and the period during which black is displayed, so that the contrast difference is hardly generated. Thereby, the visibility is limited.

Further, in the case where n is 1, the linearly-polarized light is given the phase difference of "$3\lambda/4$". Therefore, the linearly-polarized light is also converted into the circularly-polarized light, and returns to the polarizing plate. In the case where n is 2, the linearly-polarized light is given the phase difference of "$5\lambda/4$", which is equivalent to the phase difference of "$\lambda/4$". Thus, even if n is 0, or any positive or negative integer, the circularly-polarized light returns to the polarizing plate. Therefore, the visibility can be limited.

Meanwhile, in the case of the transmissive liquid crystal display device, the combination of the phase difference member and the liquid crystal panel gives the linearly-polarized light which has passed through the second polarizing plate, the phase difference of "$n\lambda/2+\lambda/4$ (n is 0, or a positive or negative integer)", for example. That is, the optical effect of limiting the visibility is the same as with the liquid crystal display device of the reflective-type.

The phase difference member is preferably a phase plate having a relationship of nx=ny>nz or nx=ny<nz (where nx is a principal refractive index in an x axis direction, ny is a principal refractive index in a y axis direction, and nz is a principal refractive index in a z axis direction, the x axis direction, the y axis direction, and the z axis direction being orthogonal to each other); and the phase plate is preferably arranged such that an xy plane of the phase plate, and an absorption axis of the polarizing plate are parallel to each other, the xy plane being related to the principal refractive index nx and the principal refractive index ny.

That is, since the phase difference member has the relationship of "nx=ny", the phase difference member does not have the optical anisotropy with respect to the light traveling in the direction along the z axis direction. Therefore, in a case where the viewer views the liquid crystal panel in the z axis direction, that is, in the front direction, the phase difference member creates no effect, and the visibility is not limited.

On the other hand, the phase difference member has the optical anisotropy with respect to the light traveling along the direction at the specific polar angle $\Phi k$ ($0°<\Phi k<90°$), so that, as described above, the visibility can be limited by setting the retardation of the phase difference member.

In a case where the phase difference member has the relationship of "nx=ny>nz", if the principal refractive indexes nx, ny, and nz are shown in a three-dimensional manner, these forms an elliptic sphere whose height is shorter than its width. Further, in a case where the phase difference member has the relationship of "nx=ny<nz", if the principal refractive indexes nx, ny, and nz are shown in the three-dimensional manner, these forms an elliptic sphere whose shape is like a standing egg. Whichever is the shape of the elliptic sphere, when the liquid crystal panel is viewed in the direction at the polar angle $\Phi k$ ($0°<\Phi k<90°$) thus set, uniform luminance is displayed except in directions at specific azimuth angles, and no negative effect, such as a strain, is caused on the displayed images. In other words, it is possible to limit the visibility in the case where the liquid crystal panel is viewed in the direction at the polar angle $\Phi k$ ($0°<\Phi k<90°$) thus set, that is, the oblique direction, while securing the state where there is no azimuth angle dependence in an oblique viewing angle.

Further, for example, in order that the combination of the phase plate and the liquid crystal panel generates the phase difference of "$3\lambda/4$" through the entire light path in the case where the liquid crystal panel is viewed in the direction at the polar angle $\Phi k$ ($0°<\Phi k-90°$) thus set, the thickness of the phase plate, the ratio of the principal refractive index nx (or ny) to the principal refractive index nz, and the retardation of the liquid crystal panel may be set so that the phase difference of "$3\lambda/4$" is generated.

The phase difference member is preferably a phase plate having a relationship of nx>ny=nz, nz=nx>ny, nx>ny>nz, nx>nz>ny, or nz>nx>ny (where nx is a principal refractive index in an x axis direction, ny is a principal refractive index in a y axis direction, nz is a principal refractive index in a z axis direction, the x axis direction, the y axis direction, the z axis direction being orthogonal to each other); and the phase plate is preferably arranged such that either an axis direction of nx or an axis direction of ny is parallel to an absorption axis of the polarizing plate.

That is, even if nx and ny are not equal to each other, by arranging the phase plate so that either the nx axis direction or the ny axis direction is parallel to the direction of the absorption axis, no phase difference will be generated in the plane parallel to the display surface. Therefore, a positive A plate (nx>ny=nz), a negative A plate (nz=nx>ny), an X plate (nx>ny>nz), or the like can be used as the phase plate, as long as it satisfies the above condition.

The phase difference member may include a laminate of a plurality of phase plates.

That is, if the phase difference member includes the laminate of the plurality of phase plates, the following two effects can be achieved.

The first effect is that the combination of the plurality of phase plates and the liquid crystal panel can generate the phase difference of "$n\lambda/2+\lambda/4$ (n is 0, or a positive or negative integer)" in the case where the liquid crystal panel is viewed in the direction at the constant polar angle $\Phi k$ ($0°<\Phi k<90°$) thus set. This makes it possible to satisfy the above condition by use of the plurality of phase plates even if a single phase plate cannot generate the above phase difference.

The second effect is that the combination of the first phase plate, the second phase plate, and the liquid crystal panel can generate (i) a first phase difference of "$n\lambda/2+\lambda/4$ (n is 0, or a positive or negative integer)" in a case where the liquid crystal panel is viewed in a direction at a constant first polar angle Φk (0°<Φk<90°), and simultaneously (ii) a second phase difference of "nλ/2+λ/4 (n is 0, or a positive or negative integer)" in a case where the liquid crystal panel is viewed in a direction at a constant second polar angle Φk (0°<Φk<90°), the second phase difference being different from the first phase difference. This can limit the visibility in the directions at a plurality of polar angles Φk, so that it becomes possible to limit the visibility in a wider range of the oblique viewing directions.

The absorption axis of the polarizing plate and a slow axis of the phase difference member are preferably parallel to a top-bottom direction of the display surface or a left-right direction of the display surface in a case where a viewer views information displayed on the display surface of the liquid crystal display device.

For example, if the absorption axis of the polarizing plate and the slow axis of the phase difference member are set to be parallel to the top-bottom direction of the display screen, it is possible to obtain a liquid crystal display device which displays (i) white with respect to the left-right direction and the front direction, and (ii) black with respect to the other directions. Accordingly, it becomes possible to successfully prevent other people from looking at the content displayed on the display surface, in the top-bottom direction, or an oblique direction.

Further, if the absorption axis of the polarizing plate and the slow axis of the phase difference member are set to be parallel to the left-right direction of the display screen, it becomes possible to obtain a liquid crystal display device which displays (i) white with respect to the top-bottom direction and the front direction, and (ii) black with respect to the other directions. Accordingly, it becomes possible to successfully prevent other people from looking at the content displayed on the display surface in the left-right direction, or an oblique direction.

Further, it is possible to set (i) the absorption axis of the polarizing plate to be parallel to the top-bottom direction or the left-right direction of the display screen, the top-bottom direction and the left-right direction being the ones in a case where the viewer views the information displayed on the display surface of the liquid crystal display device, and simultaneously (ii) the slow axis of the phase difference member to be perpendicular to the display screen.

For example, if the absorption axis of the polarizing plate is set to be parallel to the top-bottom direction of the display screen, and the slow axis of the phase difference member is set to be perpendicular to the display screen, it becomes possible to obtain a liquid crystal display device which displays (i) white with respect to the top-bottom direction and the front direction, and (ii) black with respect to the other directions. Accordingly, it becomes possible to successfully prevent other people from looking at the content displayed on the display surface, in the left-right direction, or an oblique direction.

Further, if the absorption axis of the polarizing plate is set to be parallel to the left-right direction of the display screen, and the slow axis of the phase difference member is set to be perpendicular to the display screen, it becomes possible to obtain a liquid crystal display device which displays (i) white with respect to the left-right direction and the front direction, and (ii) black with respect to the other directions. Accordingly, it becomes possible to successfully prevent other people from looking at the content displayed on the display surface, in the top-bottom direction, or an oblique direction.

A combination of an arrangement recited in a certain claim and another arrangement recited in another claim is not limited to a combination of the arrangement recited in the certain claim and an arrangement recited in a claim from which the certain claim depends from. Any combination of the arrangement recited in the certain claim and other claims from which the certain claim does not depend is possible.

Objects, features, and strengths of the technology disclosed herein will be made clear by the description below. Further, the advantages of the technology disclosed herein will be evident from the following explanation in reference to the drawings.

BRIEF DESCRIPTION OF DRAWINGS

FIG. 7 is a view illustrating refractive indexes of a negative C plate: (a) of FIG. 7 illustrates a relationship between three principal refractive indexes "nx", "ny", and "nz"; and (b) of FIG. 7 illustrates the relationship in an optical indicatrix.

FIG. 18 is a view illustrating a relationship between three principal refractive indexes "nx", "ny", and "nz" of a phase plate which can apply to a liquid crystal display device in accordance with still another embodiment of the technology disclosed herein: (a) of FIG. 18 illustrates a case of a positive A plate; (b) of FIG. 18 illustrates a case of a negative A plate; (c) of FIG. 18 illustrates a case of an X plate; and (d) and (e) of FIG. 18 illustrate cases of a third phase plate different from the above plates.

FIG. 19 is an explanatory view in which such an optical effect that the reflective liquid crystal display device illustrated in FIG. 1 limits the visibility in the oblique directions is shown by changes in polarization state of light.

FIG. 20 is an explanatory view in which such an optical effect that a transmissive liquid crystal display device illustrated in FIG. 21 or FIG. 22 limits the visibility in the oblique directions is shown by changes in polarization state of light.

REFERENCE SIGNS LIST

Figure 1:
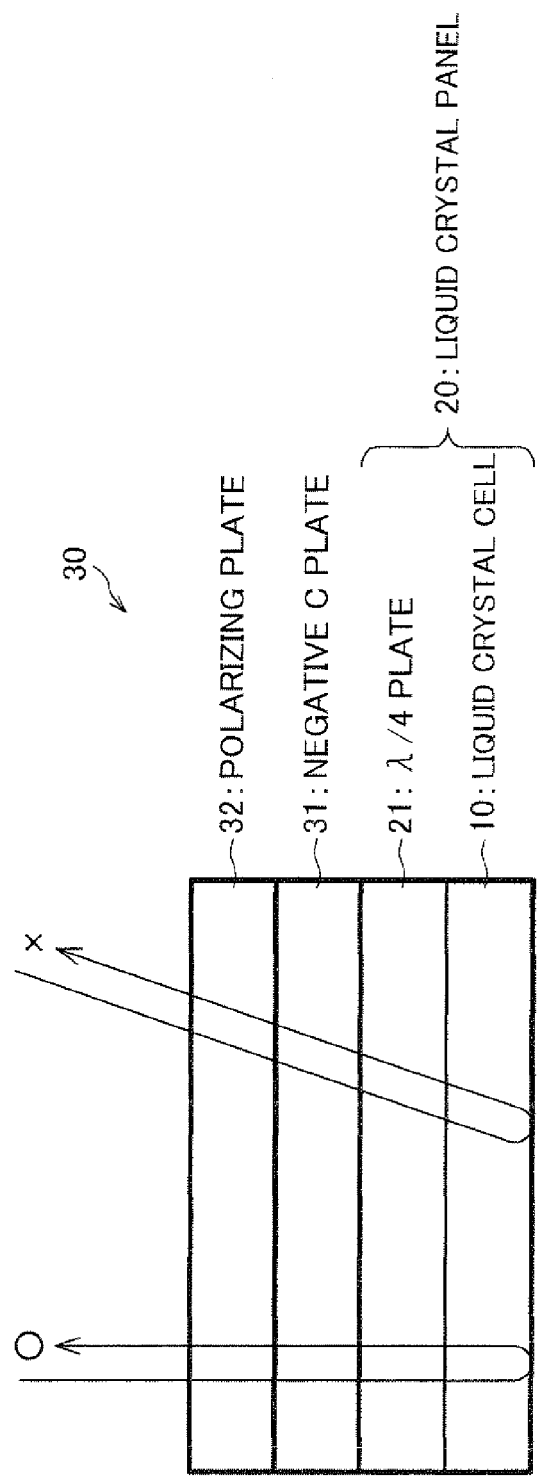
FIG. 1 is a cross-sectional view schematically illustrating an arrangement of a reflective liquid crystal display device, showing a liquid crystal display device in accordance with an embodiment of the technology disclosed herein.

8. REFLECTIVE ELECTRODE
10. LIQUID CRYSTAL CELL
20. LIQUID CRYSTAL PANEL
21. λ/4 PLATE
30. LIQUID CRYSTAL DISPLAY DEVICE
30a. LIQUID CRYSTAL DISPLAY DEVICE
30b. LIQUID CRYSTAL DISPLAY DEVICE
31. NEGATIVE C PLATE (PHASE DIFFERENCE MEMBER, PHASE PLATE)
31a. FIRST NEGATIVE C PLATE (FIRST PHASE PLATE)
31b. SECOND NEGATIVE C PLATE (SECOND PHASE PLATE)
32. POLARIZING PLATE
40. LIQUID CRYSTAL DISPLAY DEVICE
41. POSITIVE C PLATE (PHASE DIFFERENCE MEMBER, PHASE PLATE)
50. LIQUID CRYSTAL PANEL
61a. FIRST NEGATIVE C PLATE (FIRST PHASE PLATE)
61b. SECOND NEGATIVE C PLATE (SECOND PHASE PLATE)
71. NEGATIVE C PLATE (PHASE DIFFERENCE MEMBER, PHASE PLATE)

DESCRIPTION OF EMBODIMENTS

Embodiment 1

An example embodiment of the technology disclosed herein is described below with reference to FIGS. 1 through 13, and FIG. 19. For sake of simplicity, each of drawings referenced below illustrates only main members of the example embodiments of the technology disclosed herein technology disclosed herein. Therefore, a liquid crystal display device of the technology disclosed herein may include other members which are not illustrated in the drawings referenced in the present specification. Further, each member in the drawings is not exactly identical with an actual component in size, dimensional ratio of the actual components, etc.

First, the following description deals with an arrangement of a liquid crystal display device 30 of the present embodiment with reference to FIG. 1. FIG. 1 is a cross-sectional view schematically illustrating the arrangement of the liquid crystal display device 30.

The liquid crystal display device 30 is a reflective liquid crystal display device, and, as illustrated in FIG. 1, has such an arrangement that a negative C plate 31, which functions as either a phase difference member or a first phase plate, and a polarizing plate 32 are stacked on a liquid crystal panel 20 in this order. Further, the liquid crystal panel 20 includes a liquid crystal cell 10, and a λ/4 plate 21 for optical compensation.

Figure 2:
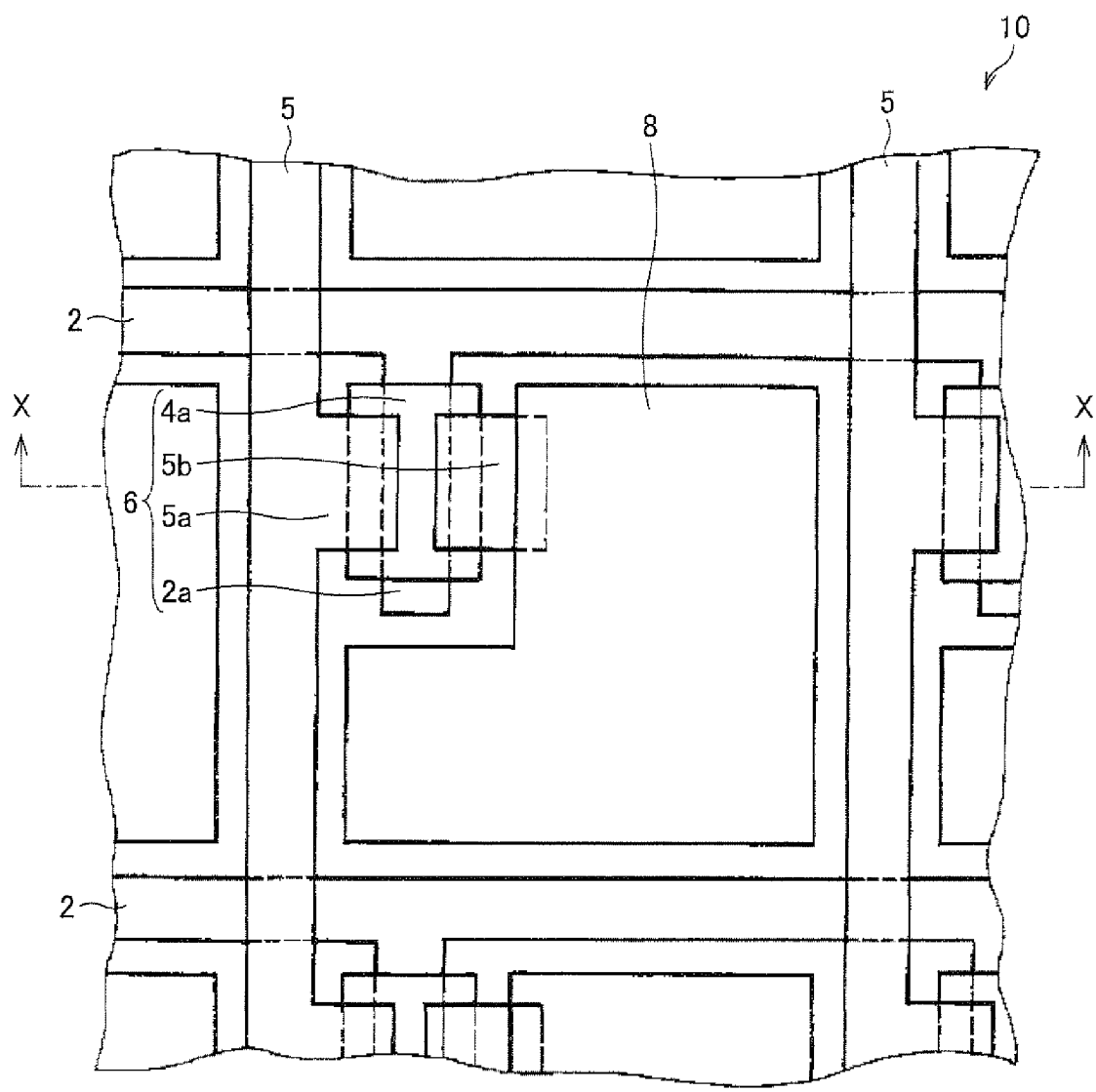
FIG. 2 is a plan view illustrating a main part of a liquid crystal cell constituting the liquid crystal display device.
Figure 3:
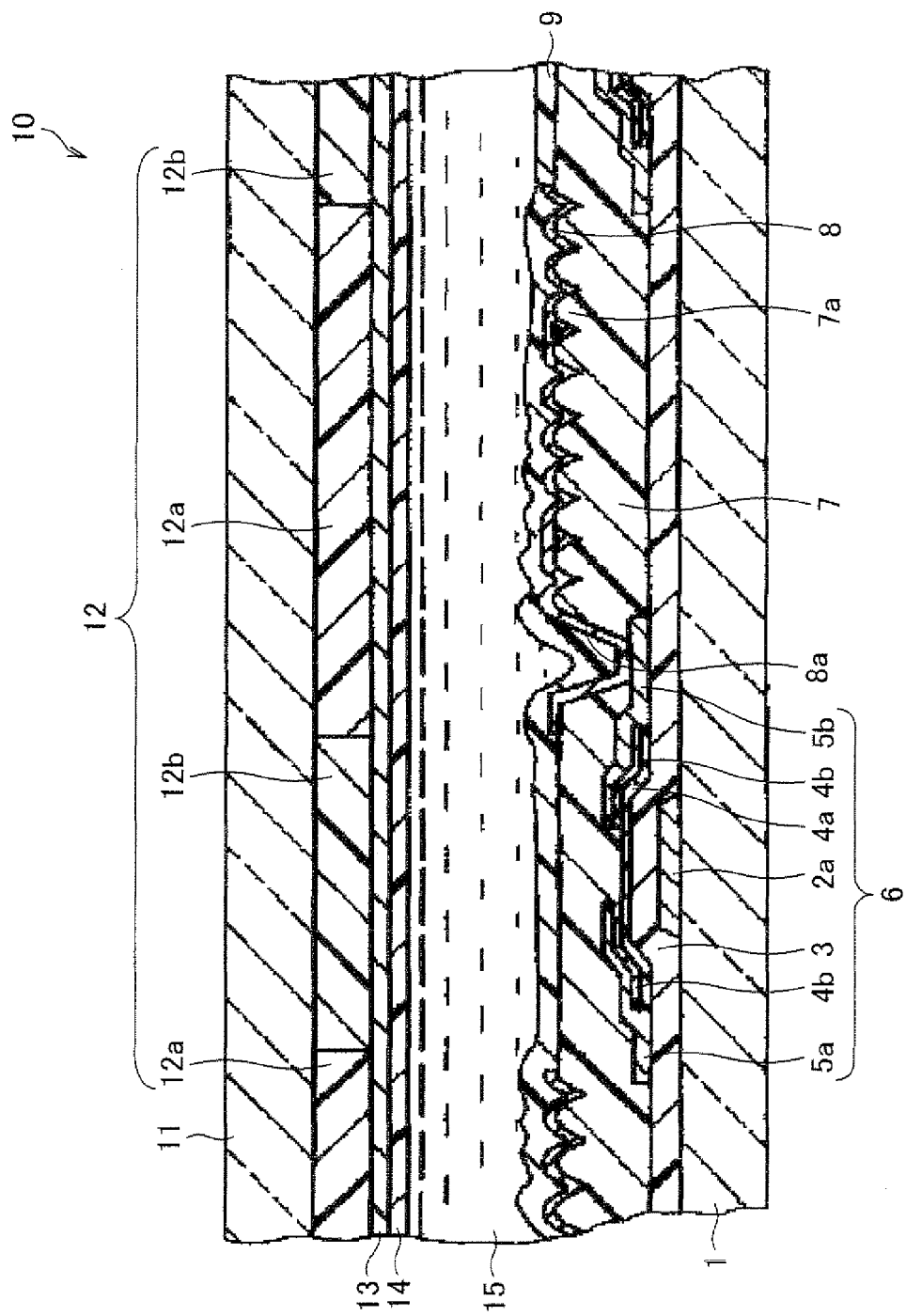
FIG. 3 is a cross-sectional view illustrating a main arrangement of the liquid crystal cell.

The following description deals with an arrangement of a liquid crystal cell 10 with reference to FIGS. 2 and 3. FIG. 2 is a plan view illustrating the arrangement of the liquid crystal cell 10, and FIG. 3 is a cross-sectional view taken along the line X-X of FIG. 2.

As illustrated in FIGS. 2 and 3, for example, in the liquid crystal cell 10, a plurality of gate bus lines 2, comprising chrome (Cr), tantalum (Ta), or the like, are provided to be parallel to each other on a substrate 1, which comprises glass or the like, and a plurality of gate electrodes 2a diverge from each of the plurality of gate bus line 2. Each of the plurality of gate bus lines 2 functions as a scanning line.

A gate insulating film 3, which comprises silicon nitride (SiNx), oxide silicon (SiOx) or the like, is formed over an entire surface of the substrate 1, so as to cover the plurality of gate electrodes 2a. A semiconductor layer 4a, which comprises amorphous silicon, multicrystalline silicon, CdSe or the like, is formed on the gate insulating layer 3 in a region above each of the plurality of gate electrodes 2a. Contact electrodes 4b-4b, which comprise amorphous silicon or the like, are formed at both ends of the semiconductor layer 4a. A source electrode 5a, which comprises titanium, molybdenum, aluminum or the like, is formed so as to be superimposed on one contact electrode 4b, and a drain electrode 5b, which comprises titanium, molybdenum, aluminum or the like in the same manner as the source electrode 5a, is formed so as to be superimposed on the other contact electrode 4b.

As illustrated in FIG. 2, a source bus line 5, which functions as a signal line, is connected to the source electrode 5a. The source bus line 5 and the gate bus line 2 intersect via the gate insulating film 3. The source bus line 5 comprises the same metal as the source electrode 5a. A TFT 6 is constituted by the gate electrode 2a, the gate insulating film 3, the semiconductor layer 4a, the source electrode 5a, and the drain electrode 5b, and has a function of a switching element.

On the other hand, an organic insulating film 7 (see FIG. 3) is formed over the entire surface of the substrate 1 so as to cover the gate bus line 2, the source bus line 5, and the TFT 6. The organic insulating film 7 has convex portions 7a..., each of which has a taper shape whose cross section has a donut or circular shape at its end section, to which convex portions 7a the reflective electrode 8 is to be formed. The organic insulating film 7 also has a contact hole 8a, which corresponds to a region where the drain electrode 5b is provided.

The reflective electrode 8, which comprises aluminum (Al), silver (Ag) or the like, is formed on the donut or circular-shaped convex portions 7a of the organic insulating layer 7, and is connected to the drain electrode 5$b$ via the contact hole 8$a$. Further, an alignment film 9 is formed on the reflective electrode 8.

A color filter 12 is formed on another substrate 11. The color filter 12 is formed such that a magenta or green filter 12$a$ is provided at a part facing the reflective electrode 8, and a black filter 12$b$ is provided at the other part which does not face the reflective electrode 8. A transparent common electrode 13, which is made from ITO (Indium Tin Oxide) or the like, is formed over an entire surface of the color filter 12, and an alignment film 14 is formed on the transparent common electrode 13.

The substrates 1 and 11 described above are attached to face each other so that the reflecting electrode 8 and the magenta or green filter 12$a$ face correspond to each other. Liquid crystal 15 is injected between the substrates 1 and 11.

Note that, for example, the liquid crystal cell 10 is required to drive the liquid crystal on a pixel basis, or a segment basis, so that the liquid crystal cell 10 has an electrode arrangement in accordance with units of display.

In the present embodiment, for example, the liquid crystal cell 10 of the liquid crystal panel 20 employs a VA (Vertical Alignment) mode, as the display mode. The technology disclosed herein, however, is not limited to this, and the liquid crystal cell 10 may employ a TN (Twisted Nematic) liquid crystal mode using positive nematic liquid crystal having twist alignment, or another display mode. Further, the liquid crystal cell 10 may be any liquid crystal cell, which is capable of displaying texts, images, or moving images, for example. Furthermore, the liquid crystal cell 10 of the technology disclosed herein may be a liquid crystal cell for color display, or a liquid crystal cell for black-and-white display.

Figure 4:
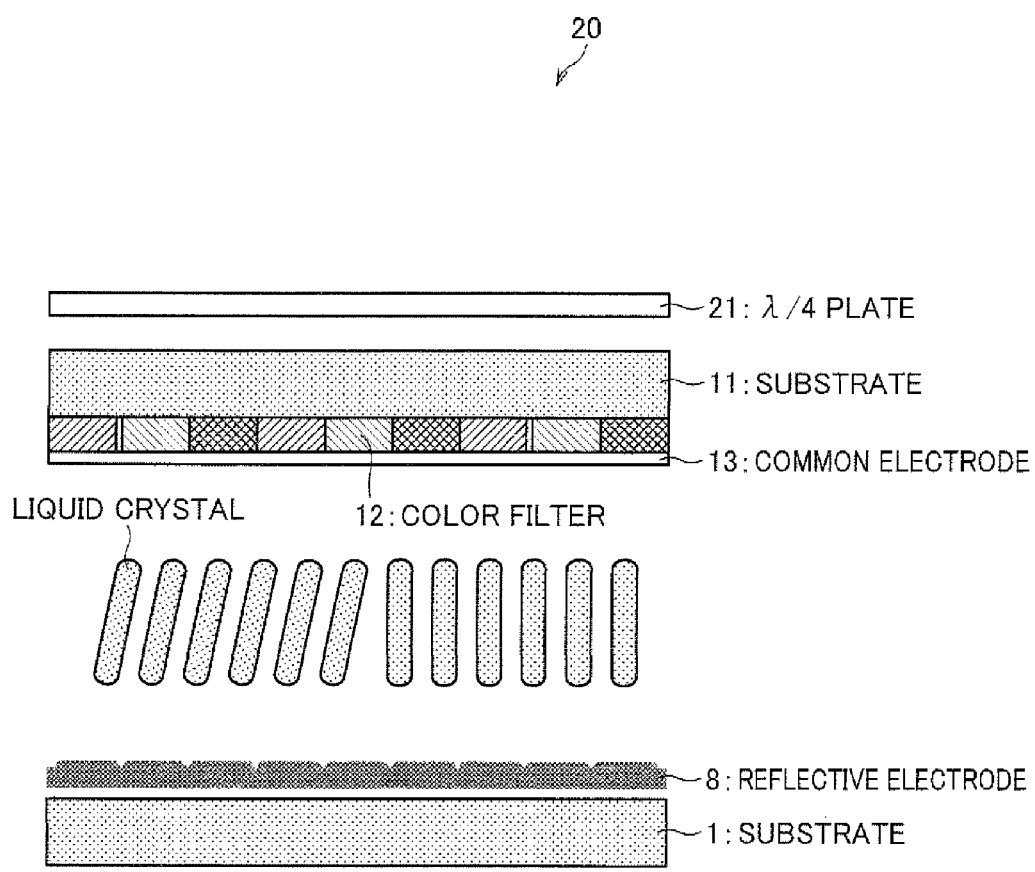
FIG. 4 is a cross-sectional view illustrating an arrangement of a liquid crystal panel of the liquid crystal display device.
Figure 5:
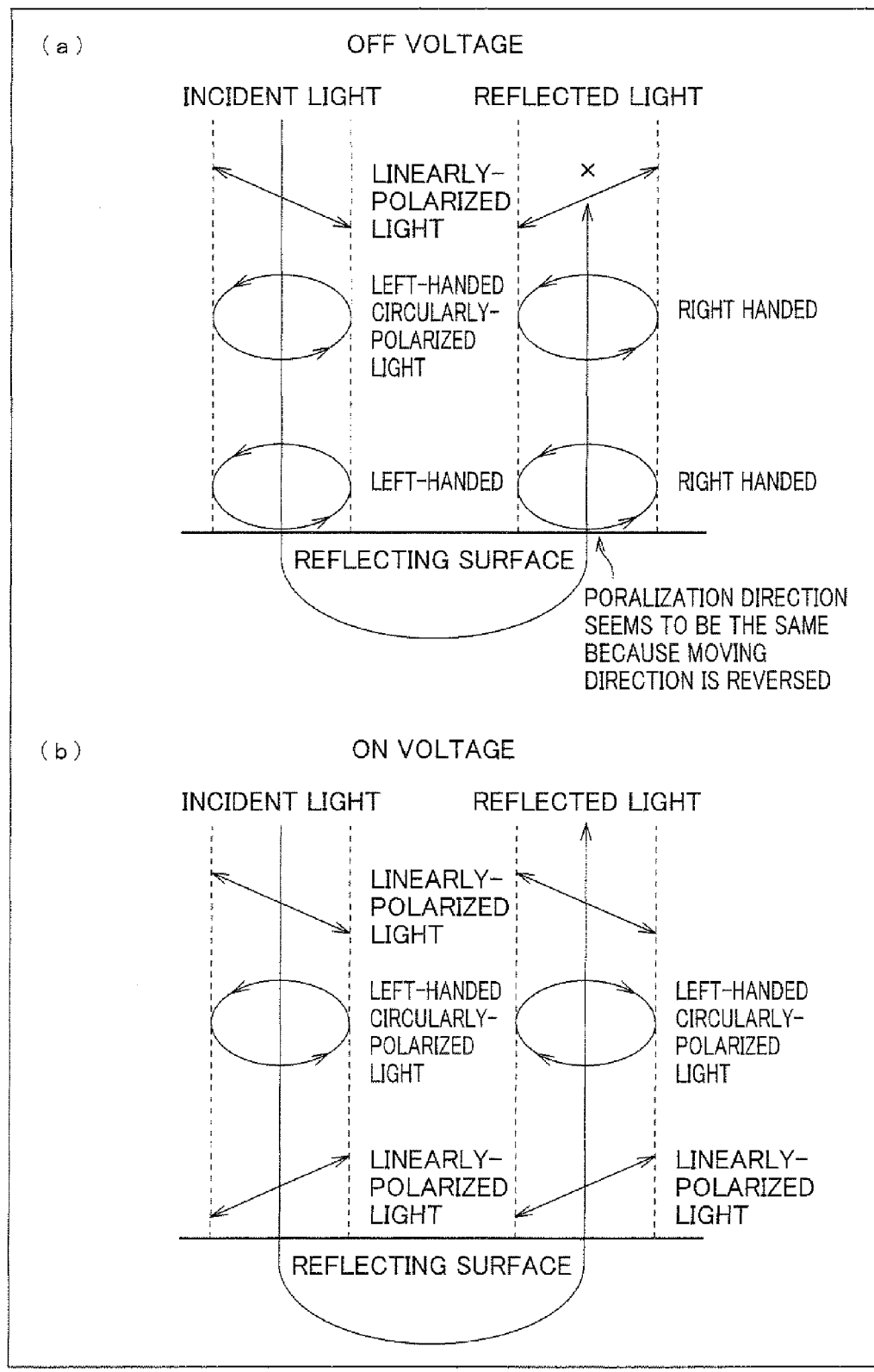
FIG. 5 is a view illustrating polarization properties of the liquid crystal panel: (a) of FIG. 5 illustrates a polarization property while no voltage is applied to the liquid crystal panel; and (b) of FIG. 5 illustrates a polarization property while a voltage is applied to the liquid crystal panel.

The following description explains display principles of the reflective liquid crystal panel 20 having the aforementioned arrangement displays images, with reference to FIG. 4, and ($a$) and ($b$) of FIG. 5. FIG. 4 is a cross-sectional view illustrating an arrangement of the liquid crystal panel 20. ($a$) of FIG. 5 is a view illustrating a path of external light traveling along a normal line direction of the liquid crystal panel 20, and a polarization state of the external light, in a case of a power-off state. ($b$) of FIG. 5 is a view illustrating the same path of the external light and polarization state as in ($a$) of FIG. 5, in a case of a power-on state.

The reflective liquid crystal panel 20 has a parallel Nicol arrangement in which incident light passes through a single polarizing plate 32 (see FIG. 1) twice (when the light enters, and when the light is reflected), as illustrated in FIG. 4. Accordingly, circularly-polarized light is optimum for the incident light reflected by the reflective electrode 8, since it is low in wavelength dependence. For this reason, the $\lambda/4$ plate 21 is provided between the liquid crystal cell 10 and the polarizing plate 32 so as to adjust the incident light to be such polarized light.

The negative C plate 31 does not have an optical anisotropy with respect to the light traveling along the normal line direction of the liquid crystal panel 20, as described later, so that the light does not change in polarization state while passing through the negative C plate 31. For this reason, the following explanation of the display principles makes no mention of the negative C plate 31.

In the case where the voltage is off, when linearly-polarized light enters from the polarizing plate 32 into the $\lambda/4$ plate 21, the linearly-polarized light is changed into left-handed circularly-polarized light, as illustrated in ($a$) of FIG. 5. This left-handed circularly-polarized light is reflected to be right-handed polarized light by the reflective electrode 8. The helical twisting direction of the circularly-polarized light is determined such that the circularly-polarized light is observed from a position toward which the circularly-polarized light travels. Then, when this right-handed circularly-polarized light passes through the $\lambda/4$ plate 21 before passing through the polarizing plate 32 again, the right-handed circularly-polarized light becomes a linearly-polarized light being orthogonal to the original linearly-polarized light. That is, the original linearly-polarized light is given a phase difference of "$\lambda/2$". Because of this, the reflected light cannot pass through the polarizing plate 32.

On the other hand, application of an on-voltage causes liquid crystal molecules in the VA mode to lie down, so that the liquid crystal cell 10 converts, by double refraction of the lying liquid crystal molecules, the left-handed circularly-polarized light which has passed through the $\lambda/4$ plate 21, into linearly-polarized light, as illustrated in ($b$) of FIG. 5. A surface of a polarized wave of the linearly-polarized light thus converted is rotated by 90° as compared with that of the linearly-polarized light which has entered through the polarizing plate 32. When the linearly-polarized light thus converted is reflected by the reflective electrode 8, and then passes through the liquid crystal layer and the $\lambda/4$ plate 21 again, a phase difference shifts by $\lambda$ (360°) from that of the original linearly-polarized light. Therefore, the linearly-polarized light thus converted turns back into the original linearly-polarized light. Accordingly, the linearly-polarized light which has turned back into the original linearly-polarized light can pass through the polarizing plate 32.

Figure 6:
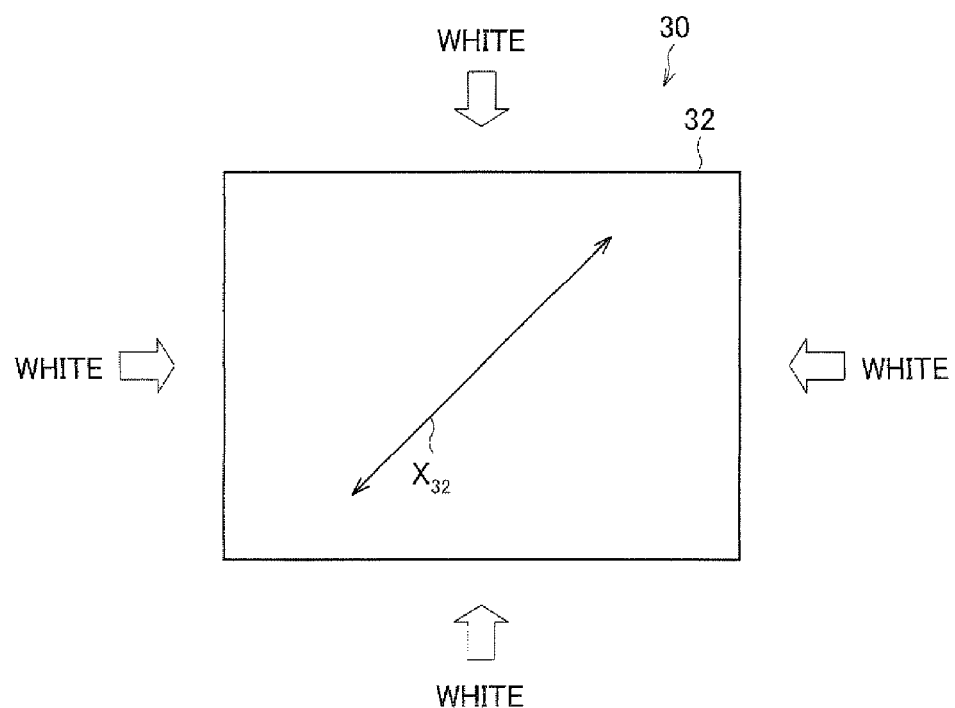
FIG. 6 is a plan view of a liquid crystal panel, showing a display property while the voltage is applied to the liquid crystal panel.

As described above, a general liquid crystal panel, like the liquid crystal panel 20 of the present embodiment, emits the linearly-polarized light through the polarizing plate 32 by the application of the on-voltage. Therefore, as illustrated in FIG. 6, in a case where a viewer views a display screen of the liquid crystal display device 30, the viewer can recognize the content displayed on the liquid crystal cell 10 in any of directions from an upper side, a lower side, a left side, and a right side of the display screen. In FIG. 6, "X32" is an absorption axis of the polarizing plate 32, and "white" is a direction in which the viewer can recognize the content.

Next, the following description deals with a specific arrangement of the present embodiment, that is, the negative C plate 31 and the polarizing plate 32, which are stacked on the upper surface of the liquid crystal panel 20.

The negative C plate 31 of the present embodiment is a phase plate which (i) has three principal refractive indexes "nx" in an x axis direction, "ny" in a y axis direction, and "nz" in a z axis direction, which axis directions are orthogonal to each other, and (ii) has a relationship of "nx=ny>nz", as illustrated in ($a$) and ($b$) of FIG. 7.

Accordingly, the negative C plate 31 does not have an influence on the limitation of visibility in a light path parallel to the normal line direction of the polarizing plate 32. The light path parallel to the normal line direction of the polarizing plate 32 is the one being in a front direction with respect to the viewer, and at a polar angle Φk of 0°. The negative C plate 31 has the characteristic of "nx=ny", so that it does not have an optical anisotropy with respect to the light traveling parallel to the normal line direction. For this reason, the linearly-polarized light passes through the negative C plate 31 without any change on both inward and outward routes.

Further, the negative C plate 31 of the present embodiment is set so that in a case where the liquid crystal display device 30 is viewed at a specific polar angle Φk (which will be explained later with reference to FIG. 9), a combination of the negative C plate 31, the $\lambda/4$ plate 21 and the liquid crystal cell 10 generates, between an ordinary light component and an extraordinary light component, (i) a phase difference of "n$\lambda$/

4+λ/8 (n is 0, or a positive or negative integer)" in a one-way light path, and (ii) a phase difference of "nλ/2+λ/4 (n is 0, or a positive or negative integer)" in a two-way light path. Note that an optical effect affecting the light traveling in an oblique direction inside the liquid crystal display device 30 will be described later.

Accordingly, in a case where the specific polar angle Φk is 15°, for example, a combination of the negative C plate 31, the λ/4 plate 21, and the liquid crystal cell 10 functions as a λ/8 plate (in a case where n is 0), a 3λ/8 plate (in a case where n is 1), or a 5λ/8 plate (in a case where n is 2), for example.

If the λ/8 plate is used as the negative C plate 31, retardation of the liquid crystal cell 10 may be set so that a combination of the λ/4 plate 21 and the liquid crystal cell 10 generates the phase difference of λ/4 (in the case where n is 1) for the one-way light path, or the phase difference of λ/2 (in the case where n is 2) for the one-way light path, for example.

Figure 8:
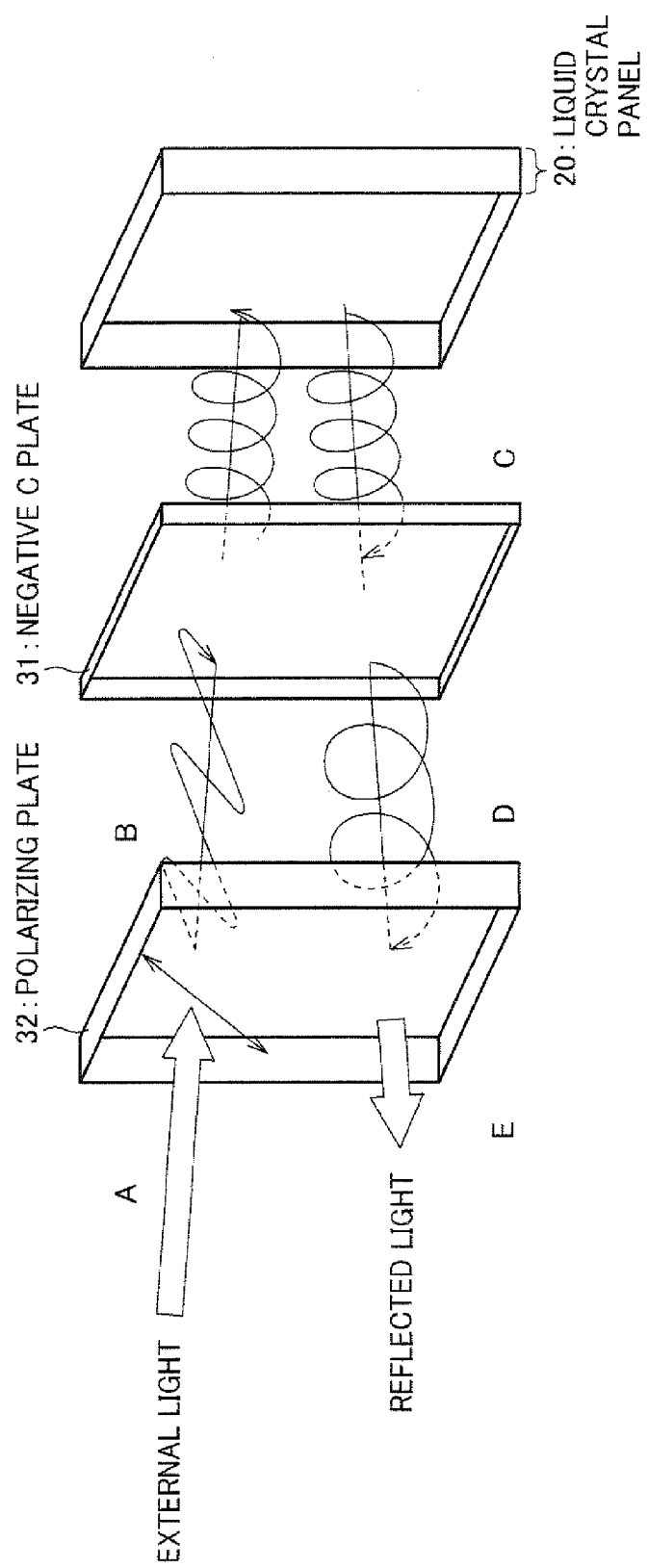
FIG. 8 is a perspective view explaining how the visibility is limited in a case where the liquid crystal display device is viewed in an oblique direction.

The following description deals with the optical effect of the liquid crystal display device 30, which optical effect limits the visibility with respect to the light entering into the liquid crystal panel 20 at the specific polar angle Φk. FIG. 8 schematically illustrates the optical effect. That is, the external light entering into the liquid crystal display device at the specific polar angle Φk is converted into the linearly-polarized light by the polarizing plate 32, and then is further converted into elliptically-polarized light by the negative C plate 31. After that, the elliptically-polarized light goes and returns through the liquid crystal panel 20, and returns to the negative C plate 31 while being elliptically-polarized light. The elliptically-polarized light which has returned to the negative C plate 31 is converted into circularly-polarized light by the negative C plate 31, and then returns to the polarizing plate 32.

An amount of the circularly-polarized light is reduced to "1/√2" by the polarizing plate 32 so that gray is displayed. In the direction at the specific polar angle Φk, this reduction in light amount occurs in both a period during which black is displayed with no (while no voltage is applied), and in a period during which white is displayed (while the voltage is applied). For this reason, a contrast difference is eliminated, so that it becomes difficult for the viewer to recognize the displayed content. In other words, the visibility is limited in a case where the display surface is viewed in the direction at the specific polar angle.

The following description deals with the optical effect described above more specifically with reference to FIG. 19. FIG. 19 illustrates a change in the polarization state of light as the light traveling inside the liquid crystal display device 30, which change is illustrated in such a manner that (i) the viewing direction toward the liquid crystal display device 30 is categorized into a front direction and an oblique direction, and (ii) a voltage application state for each of the categorized directions is categorized into an on-state and an off-state. The light path inside the liquid crystal display device 30 is divided into an incident light path (inward route) and an exit light path (outward route).

<Condition 1>

In a case of Condition 1 where the viewing direction with respect to the liquid crystal display device 30 is the front direction, and the voltage application state is the on-state, linearly-polarized light which has passed through the polarizing plate 32 passes through the negative C plate 31 without having any change in its polarization state. This is because the negative C plate 31 generates no phase difference (0) with respect to the light entering perpendicularly into the negative C plate 31, as described above. In other words, the negative C plate 31 has no optical anisotropy (nx=ny) with respect to such light.

The λ/4 plate 21 gives the phase difference of "λ/4" to the linearly-polarized light which has passed through the negative C plate 31, so that the linearly-polarized light becomes, for example, left-handed circularly-polarized light. This left-handed circularly-polarized light is given the phase difference of "λ/2" as going and returning through the liquid crystal cell 10 being driven to display images, so that the phase of the left-handed polarized light is inverted. As a result, the left-handed circularly-polarized light becomes right-handed circularly-polarized light. The liquid crystal cell 10 employs a spray alignment mode while being in the on-state.

Further, the λ/4 plate 21 gives again the phase difference of "λ/4" to the right-handed circularly-polarized light on the outward route, so that the polarization state of the right-handed circularly-polarized light becomes the same as that of the original linearly-polarized light. The negative C plate 31 also has no optical anisotropy with respect to the linearly-polarized light on the outward route as on the inward route. Therefore, the linearly-polarized light whose polarization state is the same as that of the original linearly-polarized light returns to and passes thorough the polarizing plate 32. Accordingly, white is displayed in Condition 1.

<Condition 2>

In a case of Condition 2 where the viewing direction with respect to the liquid crystal display device 30 is the front direction, and the voltage application state is the off-state, the polarization state of the light changes in the same manner as in Condition 1 until the left-handed circularly-polarized light enters into the liquid crystal cell 10. The liquid crystal cell 10 employs the vertical alignment mode while being in the off-state. For this reason, the liquid crystal cell 10 generates no phase difference (0) with respect to the light entering perpendicularly into the liquid crystal cell 10. Accordingly, the left-handed circularly-polarized light which has been emitted from the λ/4 plate 21 toward the liquid crystal cell 10 returns to the λ/4 plate 21 without having any change in its polarization state.

The λ/4 plate 21 gives the phase difference of "λ/4" to this left-handed circularly-polarized light, so that the left-handed circularly-polarized light becomes linearly-polarized light whose polarization direction is orthogonal to that of the original linearly-polarized light. Then, the linearly-polarized light returns to the polarizing plate 32. Accordingly, since the polarizing plate 32 absorbs the linearly-polarized light thus returned, black is displayed in Condition 2.

<Condition 3>

In a case of Condition 3 where the viewing direction with respect to the liquid crystal display device 30 is the oblique direction, and the voltage application state is the on-state, the negative C plate 31 which, for example, has a function of the λ/8 plate gives the phase difference of "λ/8" to the linearly-polarized light which has passed through the polarizing plate 32. For this reason, the linearly-polarized light becomes left-handed elliptically-polarized light (1), for example.

Further, the λ/4 plate 21 gives the phase difference of "λ/4" to the left-handed elliptically-polarized light (1) emitted from the negative C plate 31, so that the left-handed elliptically-polarized light (1) becomes such left-handed elliptically-polarized light (2) that a long axis of an ellipse of the left-handed elliptically-polarized light inclines at 90°. This left-handed elliptically-polarized light (2) is given the phase difference of "λ/2" as going and returning through the liquid crystal cell 10 being driven to display images, so that the phase of the left-handed elliptically-polarized light (2) is inverted. As a result, the left-handed elliptically-polarized light (2) becomes such right-handed elliptically-polarized light that the inclination of the long axis of the ellipse turns back to the inclination of that of the left-handed elliptically-polarized light (1).

Further, the λ/4 plate 21 gives again the phase difference of "λ/4" to the right-handed elliptically-polarized light on the outward route, so that the right-handed elliptically-polarized light becomes left-handed elliptically-polarized light (3) as maintaining the original inclination of the long axis of the ellipse. The left-handed elliptically-polarized light (1) and the left-handed elliptically-polarized light (3) are the same in polarization state. Then, the negative C plate 31 gives again the phase difference of "λ/8" to the left-handed elliptically-polarized light (3), so that the left-handed elliptically-polarized light (3) becomes left-handed circularly-polarized light as returning to the polarizing plate 32. Therefore, as explained above, since the polarizing plate 32 emits such linearly-polarized light that the light amount of the left-handed circularly-polarized light is reduced to "1/√2", gray is displayed in Condition 3.

<Condition 4>

In a case of Condition 4 where the viewing direction with respect to the liquid crystal display device 30 is the oblique direction, and the voltage application state is the off-state, the polarization state is the same as in Condition 3 until the left-handed elliptically-polarized light (2) enters into the liquid crystal cell 10. While no voltage is applied to the liquid crystal cell 10, the phase difference given to the polarized light by the liquid crystal cell 10 is substantially 0. For this reason, the left-handed elliptically-polarized light (2) emitted from the λ/4 plate 21 toward the liquid crystal cell 10 returns to the λ/4 plate 21 without having any change in its polarization state.

The λ/4 plate 21 gives the phase difference of "λ/4" to this left-handed elliptically-polarized light (2) on the outward route, so that the left-handed elliptically-polarized light (2) becomes right-handed elliptically-polarized light as maintaining the original inclination of the long axis of the ellipse. Further, the negative C plate 31 gives again the phase difference of "λ/4" to this right-handed elliptically-polarized light, so that the right-handed elliptically-polarized light becomes right-handed circularly-polarized light as returning to the polarizing plate 32. Therefore, since the polarizing plate 32 emits such linearly-polarized light that the light amount of the right-handed circularly-polarized light is reduced to "1/√2", gray is displayed in Condition 4 in a similar manner to Condition 3.

As a result, when the display surface of the liquid crystal display device 30 is viewed in an oblique direction, gray is displayed either during the on-state period, or during the off-state period. Accordingly, the contrast difference between the on-state period and the off-state period is significantly reduced, thereby limiting the visibility.

In the aforementioned description, the visibility is limited in the direction at the specific polar angle "Φk=15°" for the sake of simple explanation. However, in practice, in a case where, when the display surface is viewed at the specific polar angle Φk, the combination of the negative C plate 31, the λ/4 plate 21, and the liquid crystal cell 10 generates a phase difference of "nλ/4+λ/8 (n is 0, or a positive or negative integer) for the one-way light path, the visibility is limited at the specific polar angle in a range of "Φk±10°".

Further, in the direction at the specific polar angle Φk, the phase difference generated by the negative C plate 31 itself is not limited to "λ/4", and it is possible to set various phase differences, such as "±λ/8", "±3λ/8", or "±5λ/8", as long as the combination of the negative C plate 31, the λ/4 plate 21, and the liquid crystal display cell 10 can generate the phase difference of "nλ/4+λ/8 (n is 0, or a positive or negative integer)" for the one-way light path.

The liquid crystal display device 30 of the present embodiment includes the negative C plate 31, so that it is possible to generate the phase difference of "nλ/4+λ/8 (n is 0, or a positive or negative integer)" for the one-way light path in the direction at the specific polar angle Φk. This makes it possible to arbitrarily set, by changing a design of the negative C plate 31, the oblique direction in which the visibility is limited.

Specifically, the negative C plate 31 is set so that, when the liquid crystal panel 20 is viewed in the oblique direction at the specific polar angle Φk, the phase difference of "nλ/2+λ/4 (n is 0, or a positive or negative integer)" should be generated through such a light path that (i) incident light toward the negative C plate 31 is reflected by the reflective electrode 8 of the liquid crystal panel 20, (ii) the light thus reflected passes through the negative C plate 31 again so as to be emitted from the negative C plate 31. Since the length of the light path is determined in accordance with a thickness of the negative C plate 31, and a thickness of the liquid crystal panel 20, the thickness of the negative C plate 31 and a ratio of the principal refractive index nx (or ny) to the principal refractive index nz are set so that the phase difference of "nλ/2+λ/4 (n is 0, or a positive or negative integer)" is generated through the entire light path, ultimately.

The combination of the phase differences generated by the negative C plate 31 and liquid crystal panel 20 is not limited particularly, as long as the condition of "nλ/2+λ4 (n is 0, or a positive or negative integer)" is satisfied.

Figure 9:
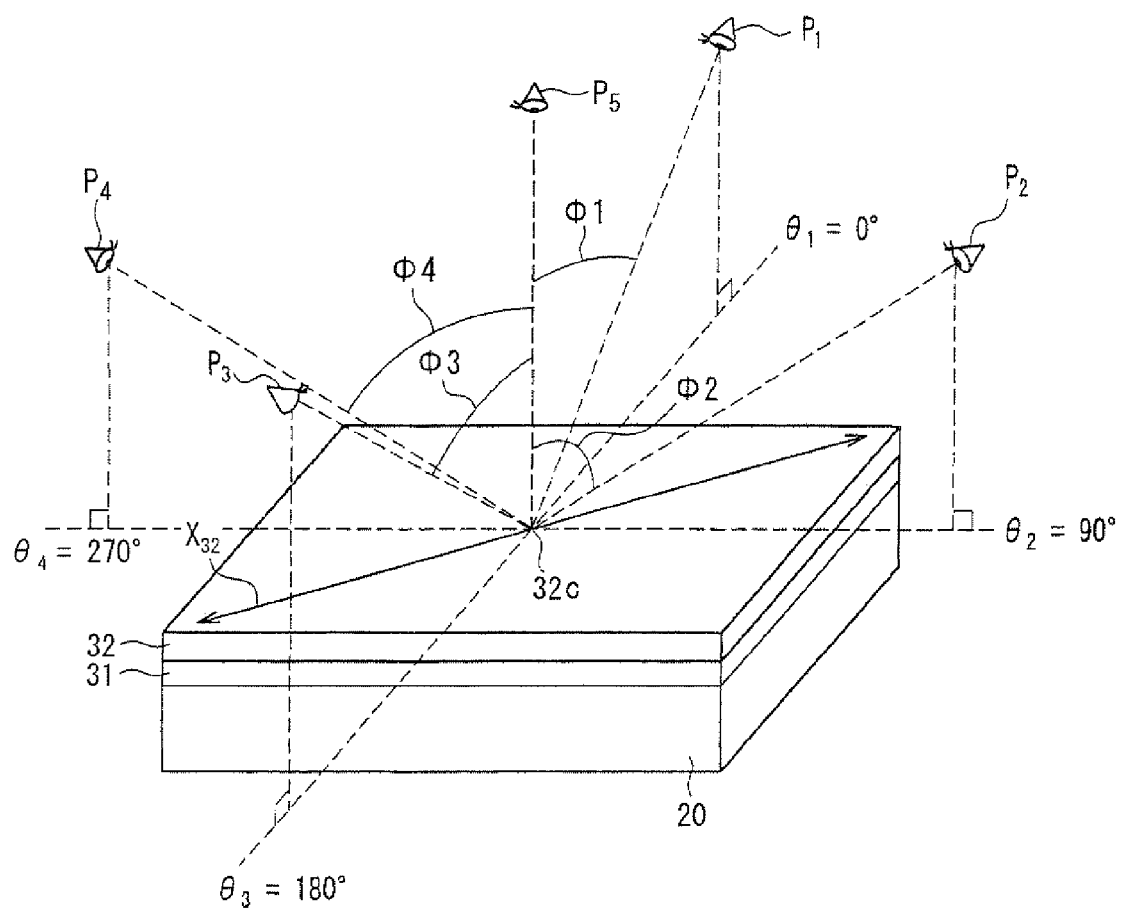
FIG. 9 is a view schematically illustrating a definition of an angle formed by a viewing point and the liquid crystal display device.
Figure 10:
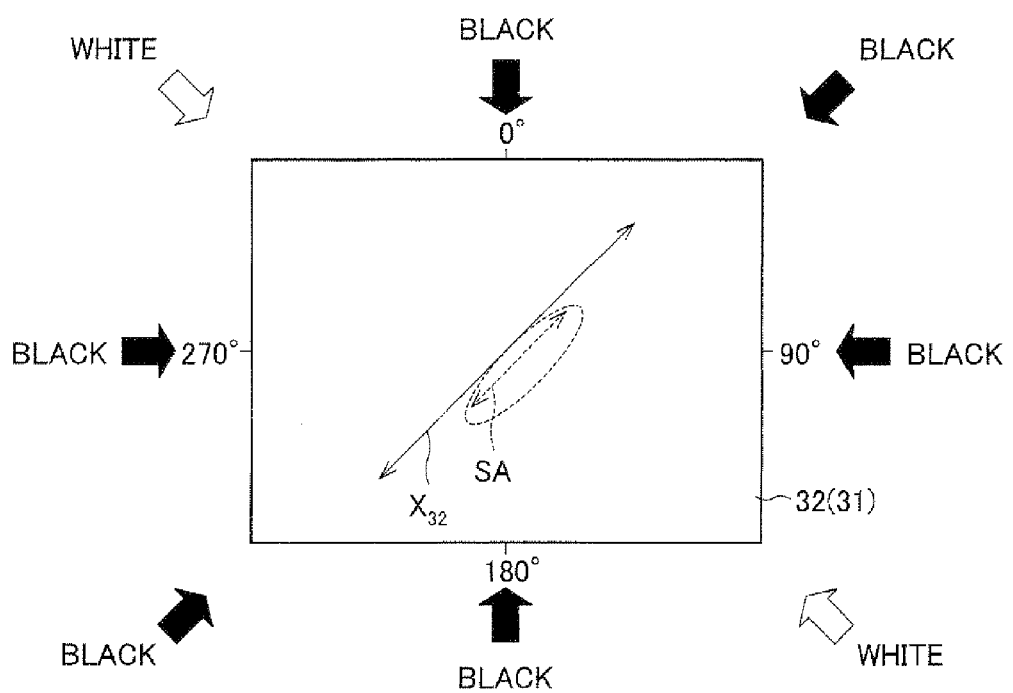
FIG. 10 is a plan view illustrating a display property of the liquid crystal display device.

The following description explains how the generation of the aforementioned phase difference limits a viewing direction in visibility. In the following explanations, an angle formed by a viewing point and the polarizing plate 32 is represented by an azimuth angle θ and a polar angle Φ by regarding a center of the surface of the polarizing plate 32 as a reference point. FIG. 9 illustrates an angle formed by each of viewing points P1 through P5 and the polarizing plate 32 of the liquid crystal display device 30.

As illustrated in FIG. 9, the azimuth angle θ is a rotation angle formed by a line connecting a center 32c of the polarizing plate 32 to a foot of a perpendicular dropped from a viewing point to a plane including the surface of the polarizing plate 32. In the example of FIG. 9, the azimuth angle θ increases in a clockwise direction on the condition that an azimuth angle of the first viewing point P1 is 0° and the polarizing plate 32 is viewed from the fifth viewing point P5 located directly above the center 32c (that is, the viewing point P5 is located on a normal line of the polarizing plate 32). Further, in the example of FIG. 9, an azimuth angle θ2 of the second viewing point P2 is 90°, an azimuth angle θ3 of the third viewing point P3 is 180°, and an azimuth angle θ4 of the fourth viewing point P4 is 270°.

The polar angle Φ is an angle formed by a line connecting the center 32c of the polarizing plate 32 to a viewing point, and the normal line of the polarizing plate 32. Here, each of the polar angles Φ1 through Φ4 is 45°, as an example.

In the case of the reflective liquid crystal panel 20, the combination of the negative C plate 31, the λ/4 plate 21, and the liquid crystal cell 10 generates the phase difference of "nλ/2+λ/4 (n is 0, or a positive or negative integer)" with respect to the polarized light which goes and returns in the direction at the specific polar angle Φk, that is, in the specific oblique direction. As a result, gray is displayed in a case where the display surface is viewed from any of the viewing points P1 (azimuth angle of 0°) P2 (azimuth angle of 90°), P3 (azimuth angle of 180°), P4 (azimuth angle of 270°), a viewing point at an azimuth angle of 45°, and a viewing point at an azimuth angle of 225° (see FIG. 10), for example. Note that in FIGS. 10 and 11, "gray is displayed" is referred to as "black" for the sake of emphasizing the meaning of the visibility limitation.

With this setting, it becomes possible to shield at least four directions (directions from an upper side, a lower side, a left side, and a right side of the display screen). However, white is displayed in a case where the display surface is viewed from either (i) the viewing point P5 (polar angle Φ=0°), which is in the front direction, (ii) a viewing point at an azimuth angle of 135°, or (iii) a viewing point at an azimuth angle of 305°.

"Gray is displayed" or "white is displayed" in the above description are display conditions while a voltage is applied to the liquid crystal cell 10.

The reason why white is displayed while the display surface is viewed from either the viewing point at the azimuth angle of 135° or the viewing point at the azimuth angle of 305° is that (i) an absorption axis X32 of the polarizing plate 32 and a slow axis SA of the negative C plate 31 are parallel to each other (an xy plane related to the principal refractive indexes nx and ny of the negative C plate 31, and the absorption axis X32 are parallel to each other), and simultaneously (ii) the direction at the azimuth angle of 135° and the direction at the azimuth angle of 305° are parallel to the transmission axis of the polarizing plate 32. The absorption axis X32 of the polarizing plate 32 and the transmission axis of the polarizing plate 32 are orthogonal to each other.

Figure 11:
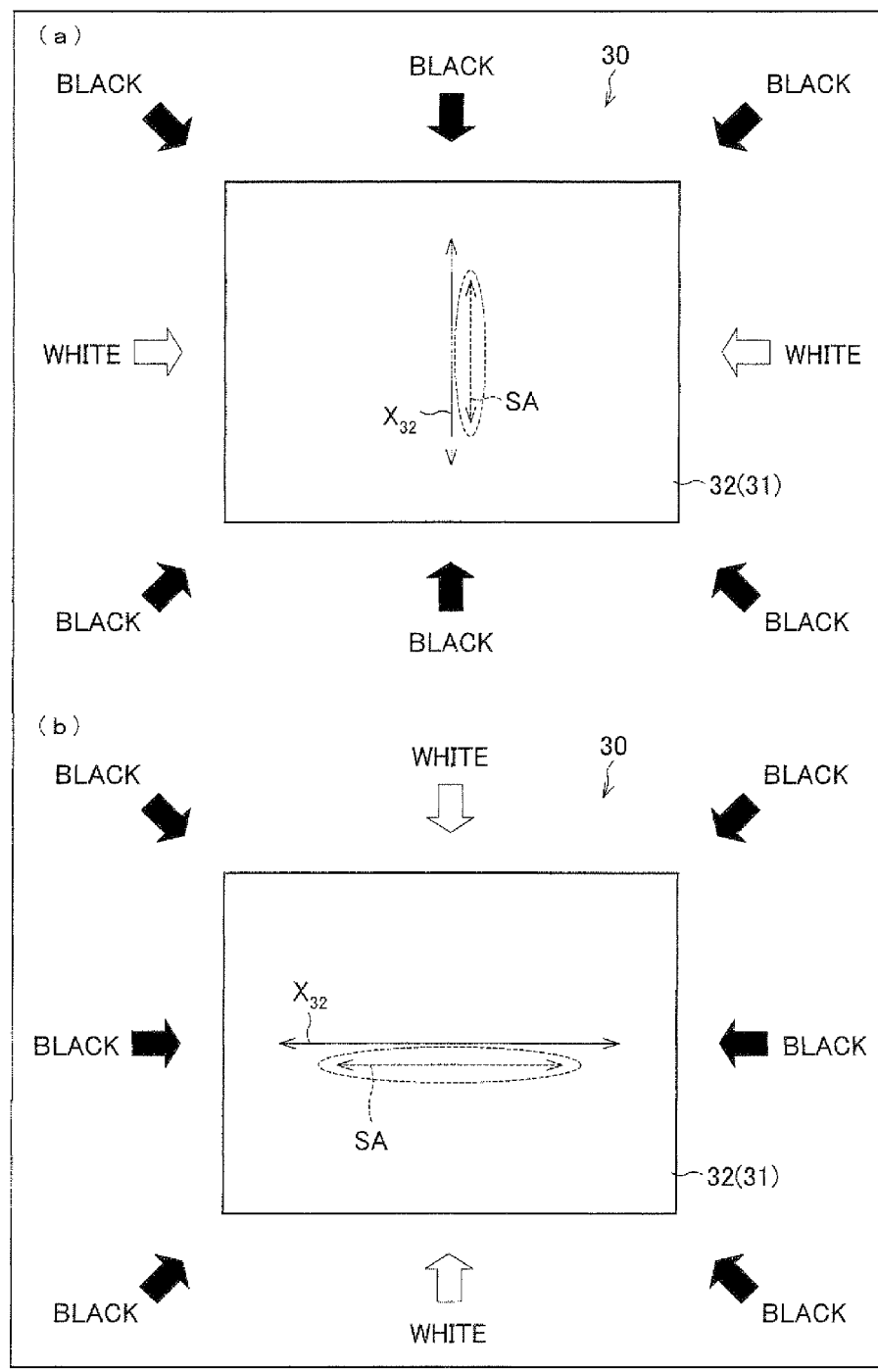
FIG. 11 is a plan view illustrating the display properties of the liquid crystal display device: (a) of FIG. 11 illustrates a display property in a case where the absorption axis of the polarizing plate illustrated in FIG. 10 is rotated by −45°; and (b) of FIG. 11 illustrates a display property in a case where the absorption axis is rotated by +45°.

As illustrated in (a) of FIG. 11, by rotating the absorption axis X32 of the polarizing plate 32 by −45° to be parallel to the top-bottom direction of the display screen, it becomes possible to realize the liquid crystal display device 30 which displays (i) white with respect to the left-right direction and the viewing point P5 (polar angle Φ=0°) (which is the front direction), and (ii) gray with respect to the other directions.

On the other hand, as illustrated in (b) of FIG. 11, by rotating the absorption axis X32 of the polarizing plate 32 by +45° to be parallel to the left-right direction of the display screen, it becomes possible to realize the liquid crystal display device 30 which displays (i) white with respect to the directions from the upper side and the lower side of the display screen, and the viewing point P5 (polar angle Φ=0°) (which is the front direction), and (ii) gray with respect to the other directions.

Accordingly, by aligning the pixels so that the absorption axis X32 of the polarizing plate 32 is parallel to the top-bottom direction or the left-right direction, it becomes possible to realize the liquid crystal display device 30 which can limit visibility in oblique directions other than the oblique directions in the directions from the upper side and the lower side of the display screen, or the oblique directions in the directions from the left side and the right side of the display screen.

In the above description, the negative C plate 31 is a single phase plate, as illustrated in FIG. 1. However, the technology disclosed herein is not limited to this, and the phase plate, which functions as either a phase difference member or a first phase plate, may be comprise two phase plates, namely, a first negative C plate 31a and a second negative C plate 31b, for example (see FIG. 12). This arrangement can also achieve the same effect as the effect described above.

Figure 12:
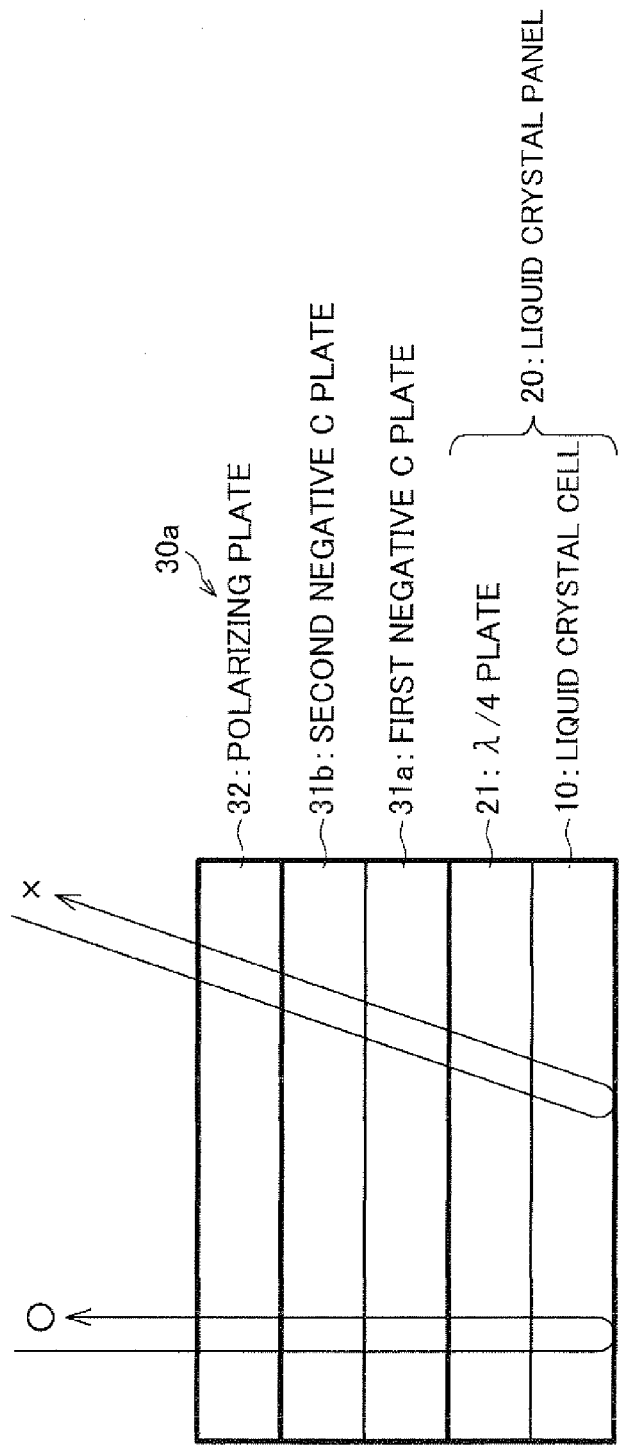
FIG. 12 is a cross-sectional view schematically illustrating an arrangement of a modified example of the liquid crystal display device.

Further, as illustrated in FIG. 12, with the combination of these first negative C plate 31a and second negative C plate 31b, it becomes possible to realize a liquid crystal display device 30a in which a combination of the first negative C plate 31a, the second negative C plate 31b, the λ/4 plate 21, and the liquid crystal cell 10 generates, in the direction at the specific polar angle Φk, (i) the phase difference of "nλ/4+λ/8 (n is 0, or a positive or negative integer)" for the one-way light path, and (ii) the phase difference of "nλ/2+λ/4 (n is 0, or a positive or negative integer)" for the two-way light path.

Figure 13:
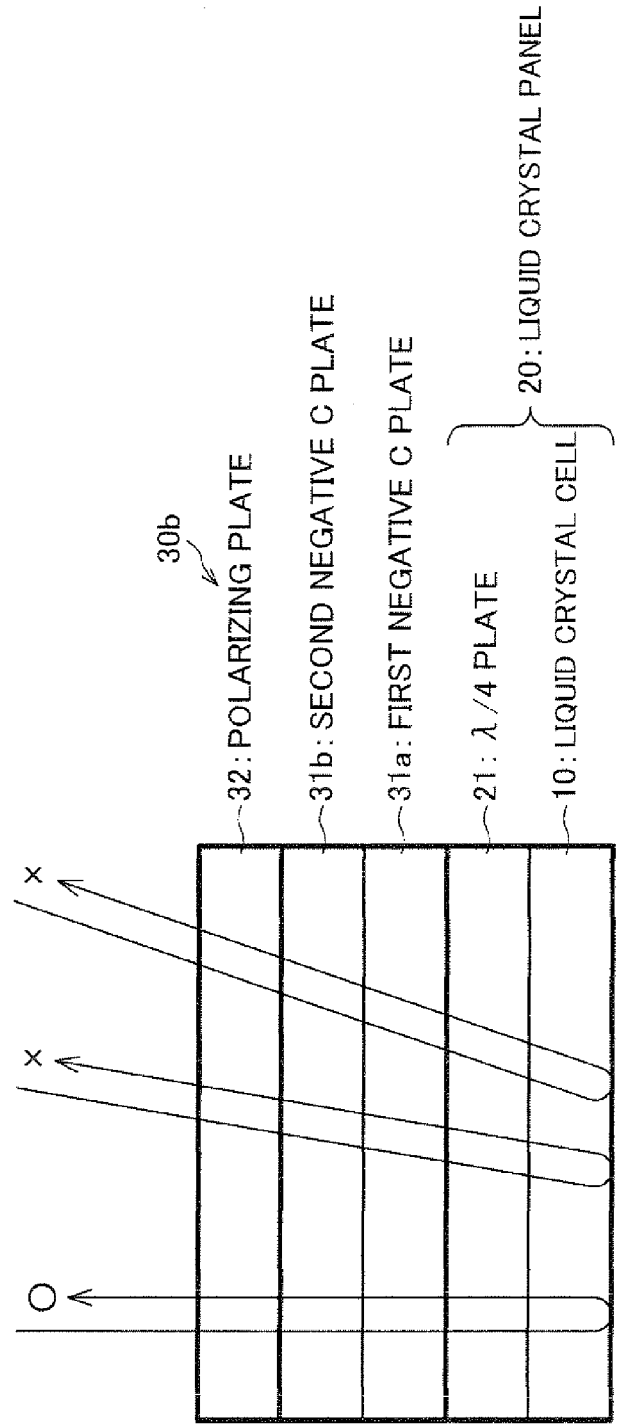
FIG. 13 is a cross-sectional view illustrating an arrangement of another modified example of the liquid crystal display device.

Further, as illustrated in FIG. 13, it becomes also possible to realize a liquid crystal display device 30b in which the combination of the first negative C plate 31a, the second negative C plate 31b, the λ/4 plate 21, and the liquid crystal cell 10 generates, (i) in a direction at a specific first polar angle Φk1, a first phase difference satisfying the condition of: "nλ/4+λ/8 (n is 0, or a positive or negative integer)" for the one-way light path; and the phase difference of "nλ/2+λ/4 (n is 0, or a positive or negative integer)" for the two-way light path, and (ii) in a direction at a specific second polar angle Φk2, a second phase difference satisfying the condition of: "nλ/4+λ/8 (n is 0, or a positive or negative integer)" for the one-way light path; and the phase difference of "nλ/2+λ/4 (n is 0, or a positive or negative integer)" for the two-way light path, which second phase difference is different from the first phase difference. This allows the visibility to be limited in a wider range of the oblique directions.

Each of FIGS. 12 and 13 illustrates an example using two phase plates, namely, the first negative C plate 31a and the second negative C plate 31b. However, the technology disclosed herein is not limited to this, and may employ more than two phase plates (three, or four phase plates, for example).

Thus, the liquid crystal display device (30, 30a, 30b) of the present embodiment includes, between the reflective liquid crystal panel 20 and the polarizing plate 32, the negative C plate 31 (or the combination of the first negative C plate 31a and the second negative C plate 31b), which functions as the phase difference member for setting the direction in which the visibility is limited.

With this arrangement, the negative C plate 31, or the combination of the first negative C plate 31a and the second negative C plate 31b sets the direction in which the visibility is limited, so that the visibility is limited in the direction thus set. Accordingly, the images displayed on the liquid crystal panel 20 are hardly viewed in the direction thus set, thereby narrowing the viewing angle.

It follows that in the case of the reflective liquid crystal panel 20, it becomes possible to provide the liquid crystal display device (30, 31a, 31b) whose viewing angle can be narrowed by arbitrarily setting the direction in which the visibility is limited, by designing the negative C plate.

Further, the liquid crystal display device 30 of the present embodiment includes the negative C plate (the first phase plate) having the relationship of "nx=ny>nz", so that if the principal refractive indexes nx, ny, and nz are shown in a three-dimensional manner, they will form a sphere shape whose height is shorter than its width. Therefore, when the liquid crystal panel 20 is viewed in the direction at the polar angle Φk (0°<Φk<90°) thus set, uniform luminance is displayed except in the directions at specific azimuth angles, and no negative effect, such as a strain, is generated on the displayed images.

In a state where the visibility is secured in such oblique directions, in the present embodiment, when the liquid crystal panel 20 is viewed in the direction at the polar angle Φk (0°<Φk<90°) thus set, the phase difference of "±λ/8", "±3λ/8", "±5λ/8", or the like is generated for the one-way light path. For this reason, the total of the phase differences on the inward and outward routes comes to "±λ/4", "±3λ/4", "±5λ/4", or the like, so that the visibility is limited when the liquid crystal panel 20 is viewed in the direction at the polar angle Φk (0°<Φk<90°) thus set (i.e. in the oblique direction).

Further, each of the liquid crystal display devices 30a and 30b of the present embodiment includes the first phase plate constituted by a plurality of phase plates, so as to realize two effects.

The first effect is that it is possible to set the phase difference for the one-way light path to be "±λ/8", "±3λ/8", "±5λ/8", or the like by the combination of the plurality of phase plates, which phase difference is generated when the liquid crystal panel 20 is viewed in a direction at a constant polar angle Φk (0°<Φk<90°) thus set. This makes it possible that in the case where the liquid crystal panel 20 is viewed in the direction at the constant polar angle Φk (0°<Φk<90°) thus set, even if a single phase plate cannot generate the phase difference of "±λ/8", "±3λ/8", "±5λ/8", or the like, for the one-way light path, the combination of the plurality of phase plates (the first negative C plate 31a and the second negative C plate 31b) can generate the phase difference of "±λ/8", "±3λ/8", "±5λ/8", or the like, for the one-way light path.

The second effect is that it is possible to set (i) a constant polar angle Φk (0°<Φk<90°) with respect to the first negative C plate 31a (the phase plate), and (ii) another constant polar angle Φk (0°<Φk<90°) different from said polar angle Φk with respect to the second negative C plate 31b (the phase plate), so that the phase difference generated when the liquid crystal panel 20 is viewed in the direction at the polar angle Φk, and the phase difference generated when the liquid crystal panel 20 is viewed in the direction at the another polar angle Φk can be selected from among ±λ/8, ±3λ/8, ±5λ/8, and the like, for the one-way light path, in such a manner that the phase differences are different from each other. This makes it possible to carry out display control to limit the visibility in a wider range of the oblique directions.

Embodiment 2

The following description deals with another embodiment of the technology disclosed herein with reference to FIGS. 14 through 17. The arrangements other than the arrangement described in the present embodiment are the same as in Embodiment 1. Further, the members having the same functions as the members illustrated in the drawings used in Embodiment 1 have the same signs, and explanations of these are omitted for the sake of simple explanation.

As illustrated in FIG. 14A, a liquid crystal display device 40 of the present embodiment includes a positive C plate 41 (second phase plate) in place of the negative C plate 31 of the liquid crystal display device 30 of Embodiment 1.

Figure 15:
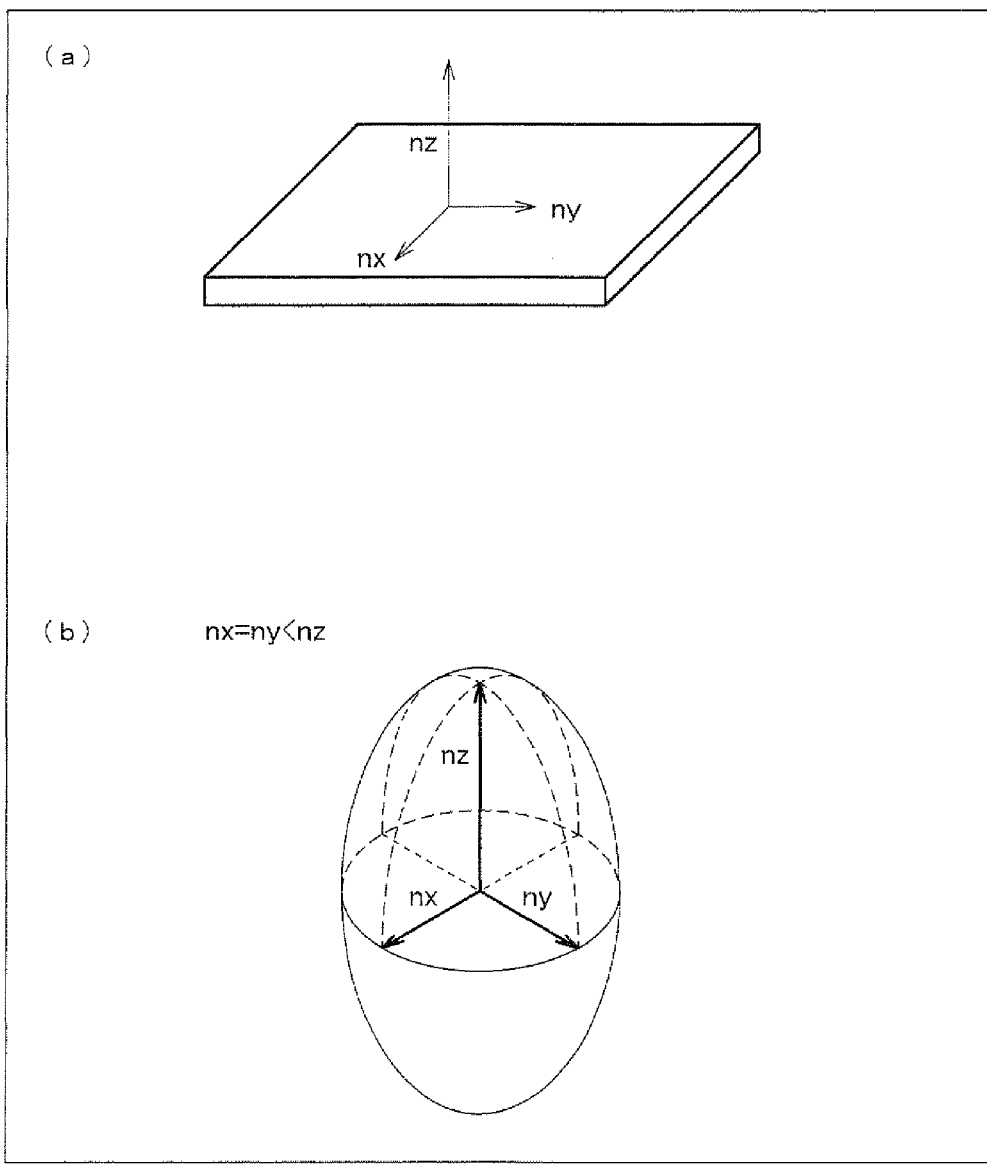
FIG. 15 is a view illustrating refractive indexes of a positive C plate: (a) of FIG. 15 illustrates a relationship between three principal refractive indexes "nx", "ny", and "nz"; and (b) of FIG. 15 illustrates the relationship in an optical indicatrix.

That is, the positive C plate 41 is a phase plate which (i) has three principal refractive indexes nx in the x axis direction, ny in the y axis direction, and nz in the z axis direction, which directions are orthogonal to each other, and (ii) has a relationship of "nx=ny<nz", as illustrated in (a) and (b) of FIG. 15. Further, the positive C plate 41 of the present embodiment generates, in combination with the λ/4 plate and the liquid crystal cell 10, the phase difference of "nλ/4+λ/8 (n is 0, or a positive or negative integer)" for the one-way light path, and the phase difference of "nλ/2+λ/4 (n is 0, or a positive or negative integer)" for the two-way light path, in the case where the liquid crystal panel 20 is viewed at the specific polar angle Φk.

Accordingly, if the specific polar angle Φk is 15°, the light, entering into the reflective liquid crystal panel 20 via the polarizing plate 32 and the positive C plate 41, passes through the positive C plate twice (when entering the liquid crystal panel 20 and when being reflected by the liquid crystal panel 20) in the same manner as in FIG. 8. As a result, the phase difference of "nλ/2+λ/4 (n is 0, or a positive or negative integer)" is generated for the two-way light path, so that there is a reduction in amount of the light passing through the polarizing plate 32 provided on the surface of the positive C plate 41. Therefore, gray is displayed in the direction at the specific polar angle of "Φk=15°" either in the period during which the voltage is applied, or in the period during which no voltage is applied. Accordingly, there is a significant reduction in contrast difference between the period during which the voltage is applied and the period during which no voltage is applied. Note that the positive C plate 41 can realize a wider range of the polar angle than that of the negative C plate 31, in which range the visibility can be limited.

In the liquid crystal display device 40 of the present embodiment, it is possible to set the phase difference of "±λ/8", "±3λ/8", ±"5λ/8", or the like, for the one-way light path in the direction at the specific polar angle Φk with respect to the positive C plate 41. Therefore, it is possible to arbitrarily set the direction in which the visibility is limited in a case where the display surface is viewed in the oblique direction. Specifically, the positive C plate 41 is designed to generate the phase difference of "±λ/8", "±3λ/8", "±5λ/8", or the like, through such a light path that the incident light entering into the positive C plate 41 is reflected by the reflective electrode 8 of the liquid crystal panel 20, and then again passes through and is emitted from the positive C plate 41, in a case where the liquid crystal panel 20 is viewed in the oblique direction at the specific polar angle Φk.

The following description explains how the visibility is limited in such a direction when the phase difference of "λ/4+λ/4=λ/2" is generated.

Figure 16:
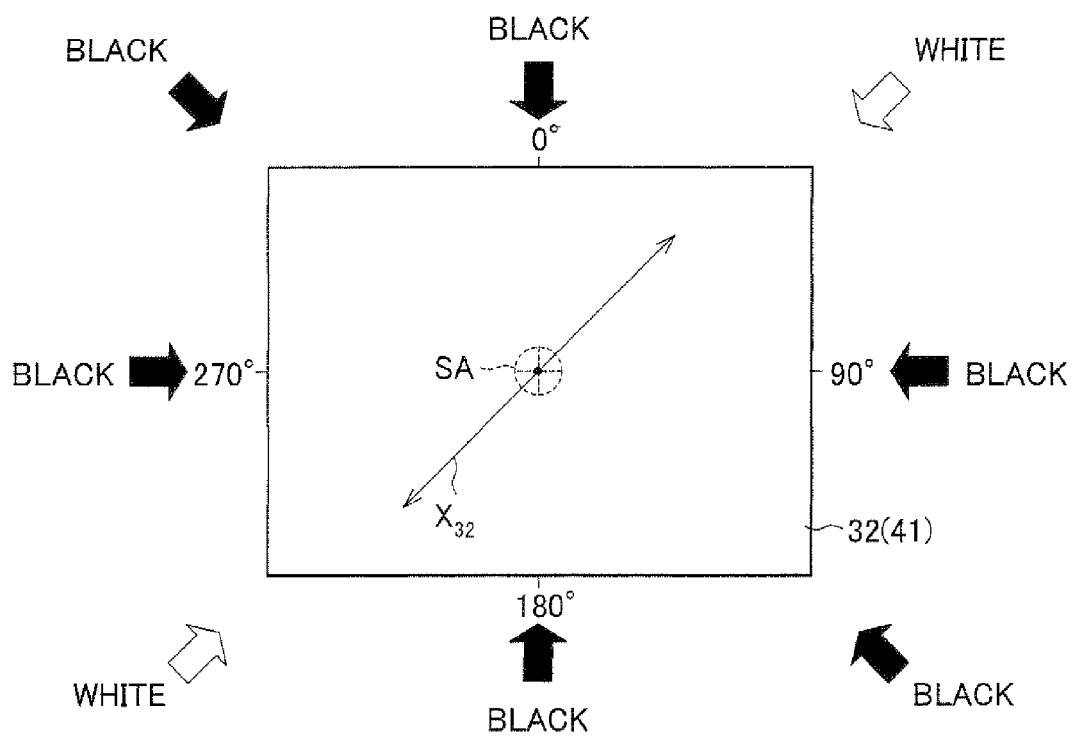
FIG. 16 is a plan view illustrating a display property of the liquid crystal display device.

In the case of the reflective liquid crystal panel 20, the combination of the positive C plate 41, the λ/4 plate, and the liquid crystal cell 10 generates the phase difference of "λ/2+λ/4 (n is 0, or a positive or negative integer)" with respect to the polarized light going and returning through these in the direction at the specific polar angle Φk (i.e. in the specific oblique direction). As a result, gray is displayed with respect to the viewing points P1 (azimuth angle of 0°), P2 (azimuth angle of 90°), P3 (azimuth angle of 180°), P4 (azimuth angle of 270°), the viewing point at the azimuth angle of 135°, and the viewing point at the azimuth angle of 305°, as illustrated in FIG. 16. Note that in FIGS. 16 and 17, "gray is displayed" is referred to as "black display" for the sake of emphasizing the meaning of the visibility limitation.

With the arrangement, it becomes possible to shield four directions (the directions from the upper side, the lower side, the left side, and the right side of the display screen). Note however that white is displayed with respect to the viewing point P5 (polar angle Φ=0°), the viewing point at the azimuth angle of 45°, and the viewing point at the azimuth angle of 225°.

That "gray is displayed" and "white is displayed" in the above description are display conditions while a voltage is applied to the liquid crystal cell 10.

The reason why white is displayed with respect to the viewing point P5 (polar angle Φ=0°), which is the front direction, is that as illustrated in (b) of FIG. 15, the positive C plate 41 does not give an influence of the double refraction to the light traveling in the normal line direction of the positive C plate 41 due to the relationship of "nx=ny", so that the light from the viewing point P5 (polar angle Φ=0°) passes through the positive C plate 41 as being the linearly-polarized light without any change.

Further, the reason why white is displayed with respect to the viewing point at the azimuth angle of 45° and the viewing angle at the azimuth angle of 225° is that (i) the absorption axis X32 of the polarizing plate 32 and the slow axis SA of the positive C plate 41 are orthogonal to each other, and (ii) the directions at the azimuth angles of 45° and 225° are parallel to the absorption axis X32 of the polarizing plate 32. Note that the slow axis SA of the positive C plate 41 is parallel to the z axis.

Figure 17:
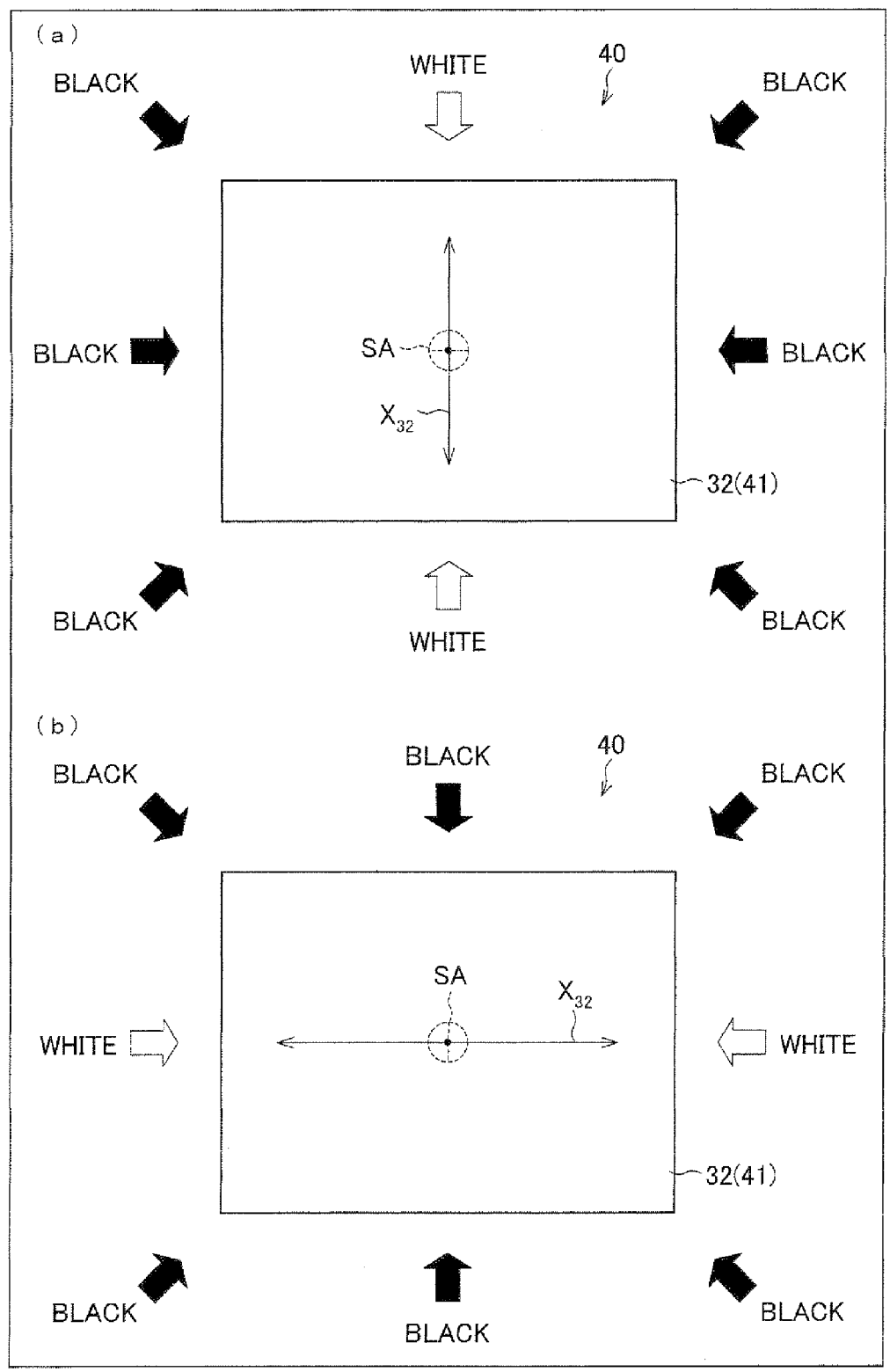
FIG. 17 is a plan view illustrating display properties of the liquid crystal display device: (a) of FIG. 17 illustrates a display property in a case where the absorption axis of the polarizing plate illustrated in FIG. 16 is rotated by −45°; and (b) of FIG. 16 illustrates a display property in a case where the absorption axis is rotated by +45°.

As illustrated in (*a*) of FIG. 17, by rotating the absorption axis X32 of the polarizing plate 32 by −45°, it becomes possible to realize the liquid crystal display device 40 which displays (i) white with respect to the directions from the upper side and the lower side of the display screen, and the viewing point P5 (polar angle Φ=0°) which is the front direction, and (ii) gray with respect to the other directions.

On the other hand, as illustrated in (*b*) of FIG. 17, by rotating the absorption axis X32 of the polarizing plate 32 by +45°, it becomes possible to realize the liquid crystal display device 40 which displays (i) white with respect to the left-right direction and the viewing point P5 (polar angle of Φ=0°) which is the front direction, and (ii) gray with respect to the other directions.

Accordingly, by aligning the pixels so that the absorption axis X32 of the polarizing plate 32 in the liquid crystal display device is parallel to the top-bottom direction or the left-right direction, it becomes possible to realize the liquid crystal display device 40 which can limit the visibility in the oblique directions other than the oblique directions in the directions from the upper side and the lower side of the display screen, or the oblique directions in the directions from the left side and the right side of the display screen.

Figure 14:
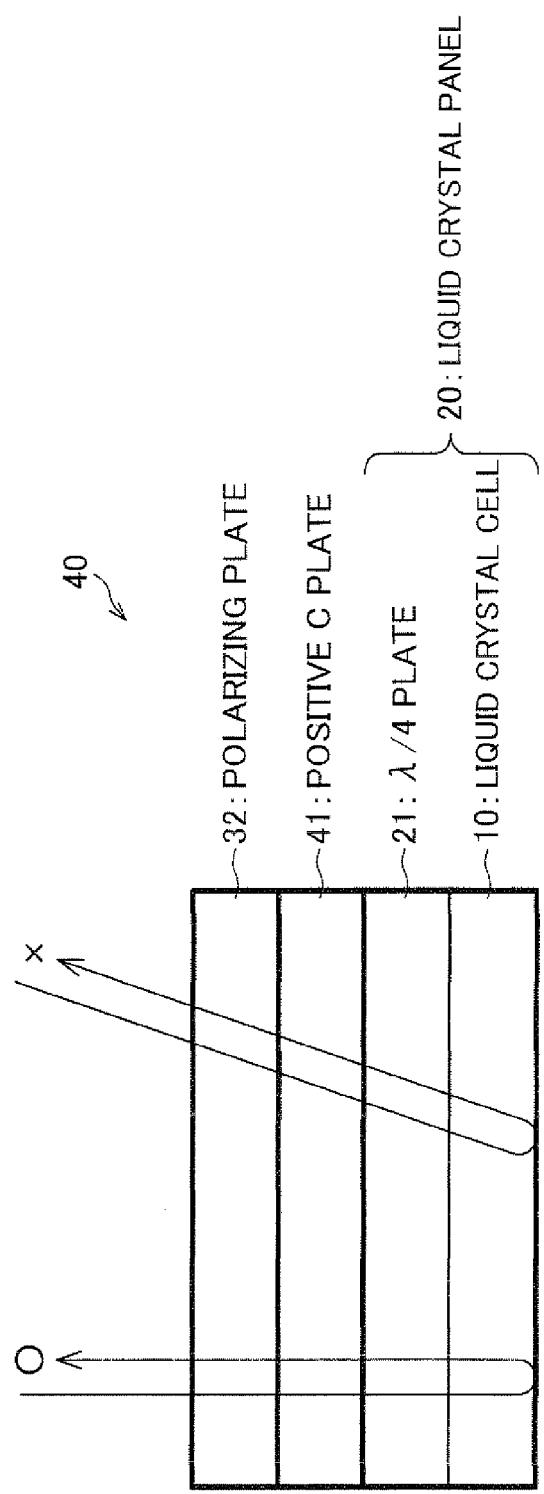
FIG. 14 is a cross-sectional view schematically illustrating an arrangement of a liquid crystal display device in accordance with another embodiment of the technology disclosed herein.

In the above description, the positive C plate 41 is a single phase plate, as illustrated in FIG. 14. However, the technology disclosed herein is not limited to this, and the positive C plate 41 may comprise two phase plates, for example. This can realize the same effect as the effect described above. Further, the number of the phase plates is not limited to two, and a plurality of phase plates (three or four phase plates, for example) may be used.

Thus, the liquid crystal display device 40 of the present embodiment includes the positive C plate 41 (the second phase plate) having the relationship of "nx=ny<nz", so that if the principal refractive indexes nx, ny, and nz are shown in a three-dimensional manner, these will form an elliptical sphere (like a standing egg) as illustrated in (*b*) of FIG. 15. For this reason, when the liquid crystal panel 20 is viewed in the direction at the polar angle Φk (0°<Φk<90°) thus set, uniform luminance is displayed except in the directions at specific azimuth angles, and no negative effect, such as a strain, is generated on the displayed images.

In such a state that the visibility is secured in the oblique directions, in the present embodiment, the phase difference of "nλ/4+λ/8 (n is 0, or a positive or negative integer)" is generated for the one-way light path in the case where the liquid crystal panel 20 is viewed in the direction at the polar angle Φk (0°<Φk<90°) thus set. Therefore, the total of the phase differences generated on the inward and outward routes will be "nλ/2+λ/4 (n is 0, or a positive or negative integer)", so that the visibility is limited when the liquid crystal panel 20 is viewed in the direction at the polar angle Φk (0°<Φk<90°) thus set (i.e. the oblique direction).

Further, in order to generate the phase difference of "nλ/4+λ/8 (n is 0, or a positive or negative integer)" for the one-way light path when the liquid crystal panel is viewed in the direction at the polar angle Φk (0°<Φk<90°) thus set, the thickness of the second phase plate, and the ratio of the principal refractive index nx (or ny) to the principal refractive index nz should be set so that the combination of the second phase plate, the λ/4 plate 21, and the liquid crystal cell 10 generates the phase difference of "nλ/2+λ/4 (n is 0, or a positive or negative integer)" on such a light path that (i) the incident light entering into the second phase plate is reflected by the liquid crystal panel 20, and then (ii) the light passes through again the second phase plate, after that (iii) the light is emitted from the second phase plate, when the liquid crystal panel 20 is viewed in the oblique direction at the specific polar angle Φk.

The combination of the phase differences generated by the positive C plate 41 and the liquid crystal panel 20 can be determined in any way, as long as the phase difference of "nλ/2+λ/4 (n is 0, or a positive or negative integer)" is generated.

Further, in the liquid crystal display device 40 of the present embodiment, the positive C plate (the second phase plate) may be constituted by a plurality of phase plates.

That is, the positive C plate 41 constituted by a plurality of phase plates can realize the two effects, as explained in the above description regarding the negative C plate 31.

Embodiment 3

The following description deals with still another embodiment of the technology disclosed herein with reference to FIG. 18. The arrangements other than the arrangement described in the present embodiment are the same as in Embodiment 1. Further, the members having the same functions as the members illustrated in the drawings used in Embodiment 1 and Embodiment 2 have the same signs, and explanations of these are omitted for the sake of simple explanation.

As illustrated in (*a*) through (*e*) of FIG. 18, a liquid crystal display device of the present embodiment includes a positive A plate (nx>ny=nz), a negative A plate (nz=nx>ny), an X plate (nx>ny>nz), or the like (each of which functions as the phase difference member (the phase plate)), in place of the negative C plate 31 of the liquid crystal display device 30 of Embodiment 1 or the positive C plate 41 of Embodiment 2.

Further, these various phase plates are arranged so that the direction of either the nx axis or the ny axis is parallel to the direction of the absorption axis X32 of the polarizing plate 32. Furthermore, each of the phase plates generates, in combination with the λ/4 plate and the liquid crystal cell 10, the phase difference of "nλ/4+λ/8 (n is 0, or a positive or negative integer)" for the one-way light path, in the case where the liquid crystal panel 20 is viewed in the direction at the polar angle Φk (0°<Φk<90°) thus set.

In other words, even if the nx and the ny are not equal to each other, it is possible to prevent the generation of the phase difference in the plane parallel to the display surface by providing the third phase plate such that either the direction of the nx axis or the direction of the ny axis is parallel to the direction of the absorption axis X32 of the polarizing plate 32. Accordingly, not only the positive A plate (nx>ny=nz), the negative A plate (nz=nx>ny), and the X plate (nx>ny>nz) but also any plates can be adopted as long as the above condition is satisfied.

The positive A plate has the relationship of "nx>ny=nz" as illustrated in (*a*) of FIG. 18. Further, the negative A plate has the relationship of "nz=nx>ny" as illustrated in (*b*) of FIG. 18. The X plate has the relationship of "nx>ny>nz" as illustrated in (*c*) of FIG. 18.

Further, in the present embodiment, it is possible to use a plate having the relationship of "nx>nz>ny" as illustrated in (*d*) of FIG. 18, or a plate having the relationship of "nz>nx>ny" as illustrated in (*e*) of FIG. 18, as such a phase plate that either the direction of the nx axis or the direction of the ny axis is parallel to the direction of the absorption axis X32 of the polarizing plate 32.

Meanwhile, in the present embodiment, each of the phase plates may also be constituted by a plurality of phase plates in the same manner as in Embodiments 1 and 2.

That is, if each of the phase plates constituted by a plurality of phase plates can realize the two effects as explained in the above description related to the negative C plate 31.

Embodiment 4

Figure 21:
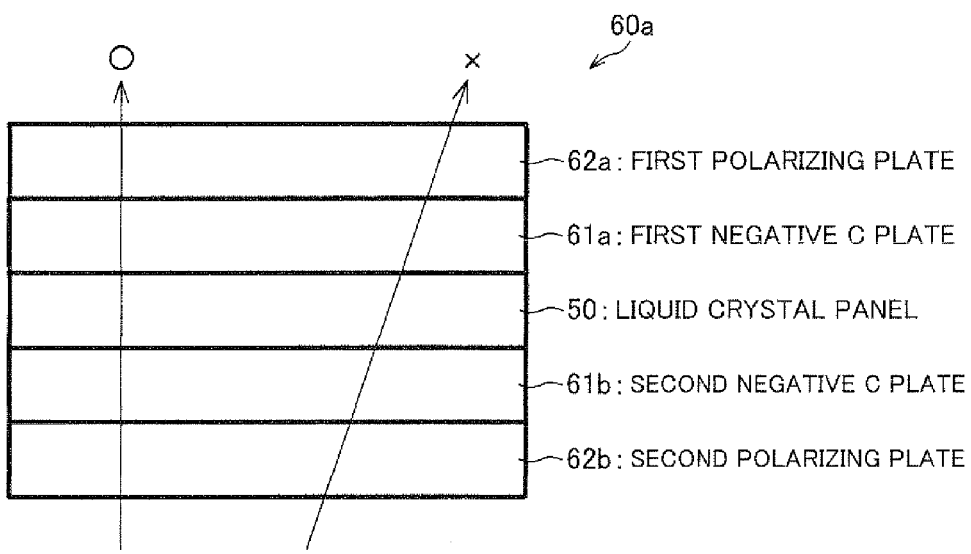
FIG. 21 is a cross-sectional view schematically illustrating an arrangement of the transmissive liquid crystal display device, showing the liquid crystal display device in accordance with still another embodiment of the technology disclosed herein.
Figure 22:
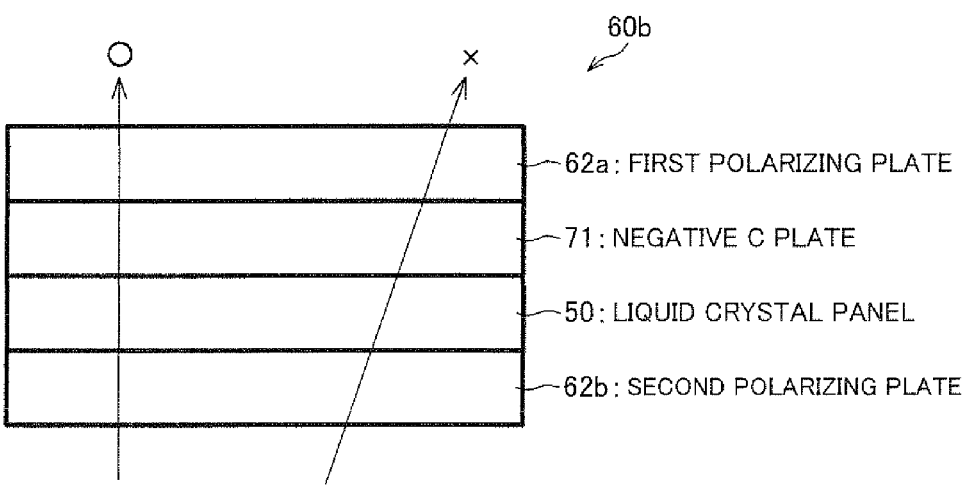
FIG. 22 is a cross-sectional view schematically illustrating a modified example of the transmissive liquid crystal display device.
Figure 23:
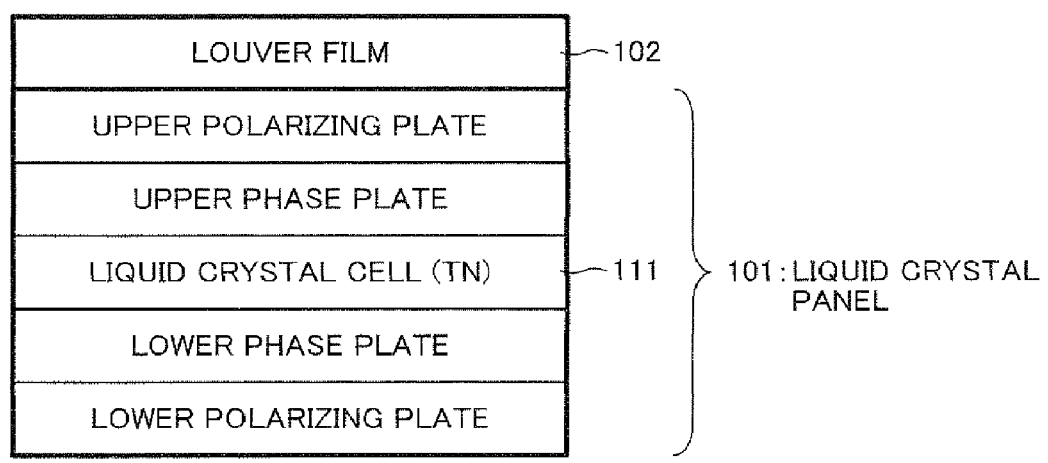
FIG. 23 is a cross-sectional view schematically illustrating a conventional arrangement of a liquid crystal display device including a louver film for controlling a viewing angle.
Figure 24:
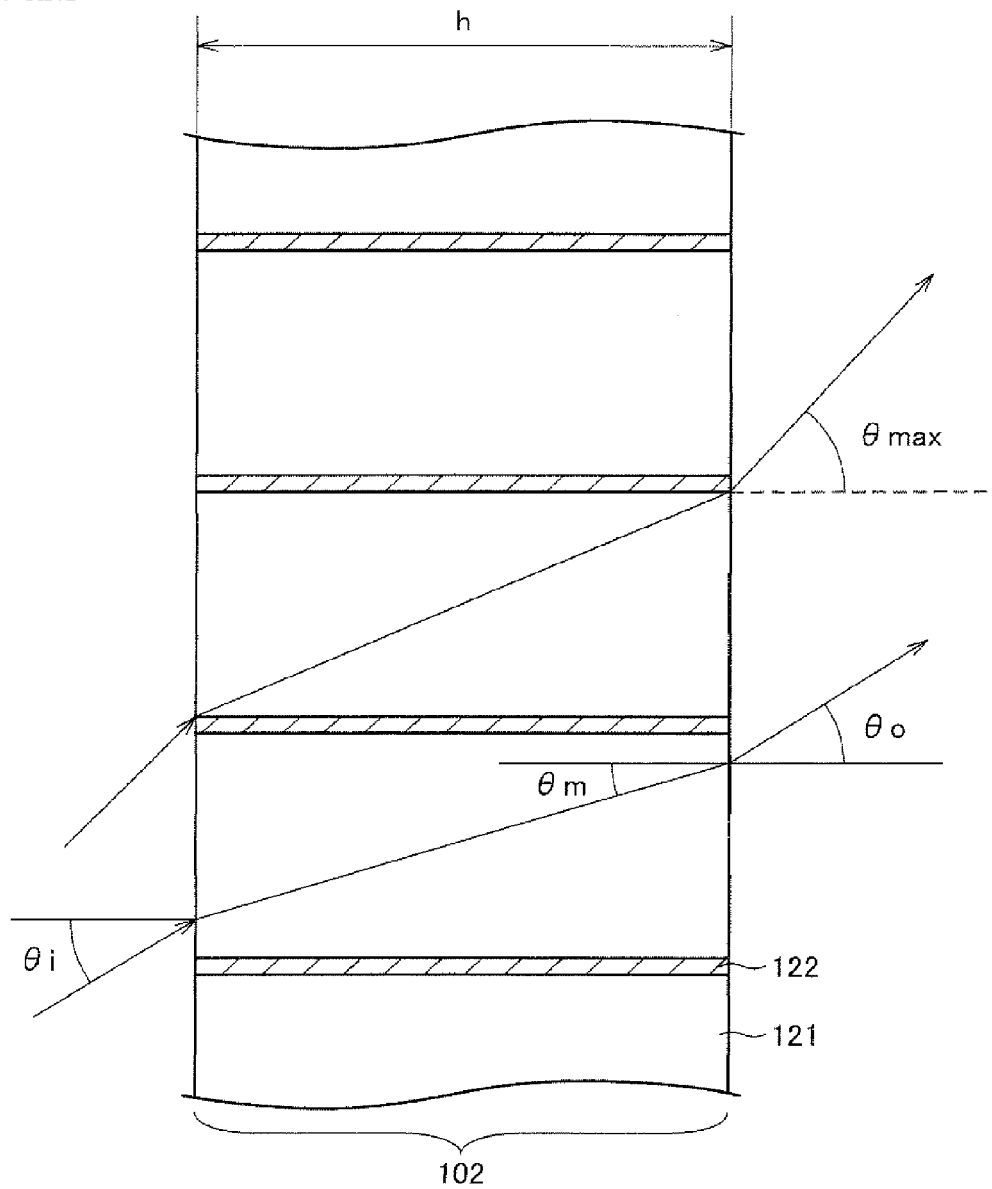
FIG. 24 is a cross-sectional view illustrating the louver film, showing how the louver film controls the viewing angle.

The following description deals with yet still another embodiment with reference to FIGS. 20 through 22. The members having the same functions as the members illustrated in the drawings used in Embodiments 1 through 3 have the same signs, and explanations of these are omitted for the sake of simple explanation.

Unlike the reflective liquid crystal display devices of Embodiments 1 through 3, a liquid crystal display device of the present embodiment is a transmissive liquid crystal display device. However, in the case of the transmissive liquid crystal display device, it is also possible to realize effective visibility limitation with a simple arrangement of the technology disclosed herein, that is, an addition of a phase plate.

First, the following description deals with an arrangement of a liquid crystal display device 60a with reference to FIG. 21. FIG. 21 is a cross-sectional view schematically illustrating the arrangement of the liquid crystal display device 60a.

The liquid crystal display device 60a includes a first polarizing plate 62a, a liquid crystal panel 50, and a second polarizing plate 62b, as a basic arrangement. The liquid crystal display device 60a further includes a first negative C plate 61a (the phase difference member, the first phase plate) between the first polarizing plate 62a and the liquid crystal panel 50, and a second negative C plate 61b (the phase difference member, the second phase plate) between the liquid crystal panel 50 and the second polarizing plate 62b.

The transmissive liquid crystal display device does not have to include the $\lambda/4$ plate since it does not have the problem of wavelength dependence described in the above description of the reflective liquid crystal display device. Accordingly, the liquid crystal panel 50 has the same arrangement as that of the liquid crystal panel 20 except that the liquid crystal panel 50 does not include the $\lambda/4$ plate 21.

An anisotropy of the refractive index of each of the first negative C plate 61a and the second negative C plate 61b, in other words, a magnitude relationship between the principal refractive indexes nx, ny, and nz, is the same as that of the negative C plate 31 explained above with reference to FIG. 7.

Further, the conception as to the inward and outward light path of the reflective liquid crystal display device 30 can apply to the phase differences generated by the first negative C plate 61a and the second negative C plate 61b with respect to the polarized light.

That is, as illustrated in FIG. 21, the first negative C plate 61a and the second negative C plate 61b are arranged to generate, in combination with the liquid crystal panel 50 (which corresponds to the liquid crystal cell 10 described above), the phase difference of "$n\lambda/2+\lambda/4$ (n is 0, or a positive or negative integer) between an ordinary light component and an extraordinary light component, through such a light path that the light entering from a second polarizing plate 62b side at the specific polar angle $\Phi k$ travels inside the liquid crystal display device 60a, and then is emitted from the first polarizing plate 62a, for example.

Accordingly, if the specific polar angle $\Phi k$ is 15°, the combination of the first negative C plate 61a, the second negative C plate 61b, and the liquid crystal panel 50 functions as the $\lambda/4$ plate (in the case where n is 0), the $3\lambda/4$ plate (in the case where n is 1), a $5\lambda/4$ plate (in the case where n is 2), or the like, with respect to the light traveling at the polar angle $\Phi k$ of 15°.

In a case where the $\lambda/8$ plate is used for each of the first negative C plate 61a and second negative C plate 61b, the retardation of the liquid crystal panel 50 may be set so that the liquid crystal cell 10 generates the phase difference of "$\lambda/2$ (in the case where n is 1)", "$\lambda$ (in the case where n is 2)", or the like.

Thus, since the phase difference of "$n\lambda/2+\lambda/4$ (n is 0, or a positive or negative integer) only has to be generated while the light passes through inside the liquid crystal display device 60a, it is possible to position the first negative C plate 61a and the second negative C plate 61b together on one side of the liquid crystal panel 50.

For example, FIG. 22 illustrates an arrangement of the liquid crystal display device 60b in which the second polarizing plate 62b, the liquid crystal panel 50, the negative C plate 71, and the first polarizing plate 62a are stacked in this order. In short, the negative C plate 71 is a single phase plate constituted by the first negative C plate 61a and the second negative C plate 61b so as to have the same functions as those of the first negative C plate 61a and the second negative C plate 61b. The negative C plate 71 may be arranged between the second polarizing plate 62b and the liquid crystal panel 50.

Meanwhile, a directional relationship between the absorption axis of the first polarizing plate 62a and the absorption axis of the second polarizing plate 62b may be a parallel Nicol relationship in which the absorption axes are arranged to be parallel to each other, or a cross Nicol relationship in which the absorption axes are arranged to be orthogonal to each other.

This is because how the liquid crystal display devices 60a and 60b limit the visibility is the same manner as that of the reflective liquid crystal display device 30. That is, the circularly-polarized light is lead to the polarizing plate provided on the light exit side, via which polarizing plate the light passing through inside the liquid crystal display device is emitted. More specifically, the circularly-polarized light is lead to the polarizing plate provided on the light exit side (the first polarizing plate 62a, for example), and the first polarizing plate 62a partially absorbs the circularly-polarized light so as to reduce the amount of the circularly-polarized light to "$1/\sqrt{2}$". This does not depend on the direction of the absorption axis of the first polarizing plate 62a either in the period during which black is displayed or in the period during which white is displayed.

<Optical Effect of Liquid Crystal Display Device 60a>

The following description specifically explains how the liquid crystal display device 60a having the arrangement described above limits the visibility of the light entering at the specific polar angle $\Phi k$, with reference to FIG. 20. FIG. 20 illustrates a change in polarization state of the light as the light travels inside the liquid crystal display device 60a from the light incident side toward the light exit side, in such a manner that (i) the viewing direction with respect to the liquid crystal display device 60a is categorized into the front direction, and the oblique directions, and (ii) the voltage application state is categorized into the on-state and the off-state for each of the front direction and the oblique directions.

In the following description, (i) the retardation of the liquid crystal panel 50 is set so that the liquid crystal panel 50 being driven to display images generates the phase difference of "$\lambda/2$ (in the case where n is 1)" with respect to the light traveling in the direction at the specific polar angle Φk, and (ii) the first polarizing plate 62a and the second polarizing plate 62b are arranged to have the parallel Nicol relationship.
<Condition 1>

In a case of Condition 1 where the viewing direction with respect to the liquid crystal display device 60a is the front direction, and the voltage application state is the on-state, the linearly-polarized light which has passed through the second polarizing plate 62b passes through the second negative C plate 61b without having any change in its polarization state, as illustrated in FIG. 21. This is because the second negative C plate 61b generates no phase difference (0) with respect to the light entering perpendicularly into the second negative C plate 61b, as described above. That is, the second negative C plate 61b does not have the optical anisotropy (nx=ny) with respect to such light.

As the linearly-polarized light (A) passes through the liquid crystal panel 50 being driven to display images, the liquid crystal panel 50 gives the phase difference of "λ/2" to the linearly-polarized light (A) which has passed through the second negative C plate 61b. As a result, the phase of the linearly-polarized light (A) is inverted so that the linearly-polarized light (A) becomes the linearly-polarized light (B) whose polarization direction is orthogonal to the polarization direction of the original linearly-polarized light (A).

Further, the linearly-polarized light (B) passes through the first negative C plate 61a without having any change in its polarization state, and then enters into the first polarizing plate 62a. The first polarizing plate 62a and the second polarizing plate 62b are arranged to have the parallel Nicol relationship, so that the transmission axis of the first polarizing plate 62a and the polarization direction of the linearly-polarized light (B) are orthogonal to each other. Accordingly, the first polarizing plate 62a absorbs the linearly-polarized light (B), so that black is displayed in Condition 1.
<Condition 2>

In a case of Condition 2 where the viewing direction with respect to the liquid crystal display device 60a is the front direction, and the voltage application state is the off-state, since any one of the second negative C plate 61b, the liquid crystal panel 50, and the first negative C plate 61a does not have the optical anisotropy, the linearly-polarized light which has passed through the second polarizing plate 62b passes through the first polarizing plate 62a while maintaining its polarization state.

Accordingly, white is displayed in Condition 2.
<Condition 3>

In a case of Condition 3 where the viewing direction with respect to the liquid crystal display device 60a is the oblique direction, and the voltage application state is the on-state, the second negative C plate 61b, which has the function of the λ/8 plate, for example, gives the phase difference of "λ/8" to the linearly-polarized light which has passed through the second polarizing plate 62b. Thereby, the linearly-polarized light becomes the left-handed elliptically-polarized light, for example.

Further, as the left-handed elliptically-polarized light passes through the liquid crystal panel 50 being driven to display images, the liquid crystal panel 50 gives the phase difference of "λ/2" to the left-handed elliptically-polarized light emitted from the second negative C plate 61b. As a result, the phase of the left-handed elliptically-polarized light is inverted, so that the left-handed elliptically-polarized light becomes such right-handed elliptically-polarized light that a long axis of its ellipse is inclined by 90° with respect to that of the left-handed elliptically-polarized light.

The first negative C plate 61a gives the phase difference of "λ/8" again to the right-handed elliptically-polarized light. Thereby, the right-handed elliptically-polarized light becomes the right-handed circularly-polarized light, and then enters into the first polarizing plate 62a. Therefore, as described above, the first polarizing plate 62a emits such linearly-polarized light that the light amount of the right-handed circularly-polarized light is reduced to "1/√2". Accordingly, gray is displayed in Condition 3.
<Condition 4>

In a case of Condition 4 where the viewing direction with respect to the liquid crystal display device 60a is the oblique direction, and the voltage application state is the off-state, the polarization state is the same as in Condition 3 until the left-handed elliptically-polarized light enters into the liquid crystal panel 50. In the case where the voltage application state is the off-state, the liquid crystal panel 50 gives the phase difference of substantially 0 to the polarized light. Therefore, the left-handed elliptically-polarized light which has entered into the liquid crystal panel 50 enters into the first negative C plate 61a without having any change in its polarization state.

The first negative C plate 61a gives the phase difference of "λ/8" again to the left-handed elliptically-polarized light. Thereby, the left-handed elliptically-polarized light becomes the left-handed circularly-polarized light, and then enters into the first polarizing plate 62a. In the same manner as in Condition 3, the first polarizing plate 62a emits such linearly-polarized light that the light amount of the left-handed circularly-polarized light is reduced to "1/√2". Accordingly, gray is displayed in Condition 3.

As a result, when the display surface of the liquid crystal display device 60a is viewed in an oblique direction, gray is displayed either in the period during which the voltage is applied, or in the period no voltage is applied. Accordingly, there is a significant reduction in contrast difference between the period during which the voltage is applied and the period during which no voltage is applied, so that the visibility is limited.
<Optical Effect of Liquid Crystal Display Device 60b>

In a case where the viewing direction with respect to the liquid crystal display device 60b is the oblique direction, and the voltage application state is the on-state, the negative C plate 71, which has the function of the "λ/4" plate, for example, gives the phase difference of "λ/4" to the linearly-polarized light which has passed through the second polarizing plate 62b. Thereby, the linearly-polarized light becomes the left-handed circularly-polarized light, for example.

Further, as the left-handed circularly-polarized light passes through the liquid crystal panel 50 being driven to display images, the liquid crystal panel 50 gives the phase difference of "λ/2" to the left-handed circularly-polarized light emitted from the negative C plate 71. As a result, the phase of the left-handed circularly-polarized light is inverted, so that and the left-handed circularly-polarized light becomes the right-handed circularly-polarized light. Then, the right-handed circularly-polarized light enters into the first polarizing plate 62a. As a result, since the first polarizing plate 62a emits such linearly-polarized light that the light amount of the right-handed circularly-polarized light is reduced to "1/√2", gray is displayed.

On the other hand, in the case where the voltage application state is the off-state, the liquid crystal panel 50 gives the phase difference of substantially 0 to the polarized light. Therefore, the left-handed circularly-polarized light which has entered into the liquid crystal panel 50 enters into the first polarizing plate 62a without having any change in its polarization state. Accordingly, gray is displayed in the same manner as described above.

Therefore, gray is displayed in the case where the display surface of the liquid crystal display device 60b is viewed in an oblique direction either in the period during which the voltage is applied, or in the period during which no voltage is applied. Thus, the visibility can be limited.

In the case of the transmissive liquid crystal display device, the phase plate is also not limited to the negative C plate, and the positive C plate illustrated in FIG. 15, or each of the phase plates illustrated in FIG. 18 can be used in the same manner as explained in the above description.

As described above, a liquid crystal display device includes: a liquid crystal panel of a reflective-type; a polarizing plate provided on a light incident side of the liquid crystal panel; and a phase difference member provided between the liquid crystal panel and the polarizing plate, the phase difference member having a retardation and being set such that the retardation for such a light path that a display surface of the liquid crystal panel is viewed in a direction at a specific polar angle $\Phi k$ ($0°<\Phi k<90°$) determines a direction in which visibility is limited.

Further, as described above, a liquid crystal display device comprises: a liquid crystal panel of a transmissive-type; a first polarizing plate provided on a light incident side of the liquid crystal panel; a second polarizing plate provided on a light exit side of the liquid crystal panel; and a phase difference member provided in at least one of (i) a position between the liquid crystal panel and the first polarizing plate, and (ii) a position between the liquid crystal panel and the second polarizing plate, the phase difference member having a retardation and being set such that the retardation for such a light path that a display surface of the liquid crystal panel is viewed in a direction at a specific polar angle $\Phi k$ ($0°<\Phi k<90°$) determines a direction in which visibility is limited.

With these arrangements, the phase plate whose retardation is set to determine the direction in which the visibility is limited is merely added either in the case of the transmissive liquid crystal panel or in the case of the reflective liquid crystal panel. Therefore, it becomes possible to provide the transmissive liquid crystal display device whose viewing angle can be narrowed with a simple arrangement by arbitrarily setting the direction in which the visibility is limited.

The embodiments and concrete examples of implementation discussed in the foregoing detailed explanation serve solely to illustrate the technical details of the technology disclosed herein, which should not be narrowly interpreted within the limits of such embodiments and concrete examples, but rather may be applied in many variations within the spirit of the technology disclosed herein, provided such variations do not exceed the scope of the patent claims set forth below. Further, an embodiment based on a proper combination of technical means disclosed in different embodiments is encompassed in the technical scope of the technology disclosed herein.

Furthermore, it is obvious that the technology disclosed herein is not limited to the range of values described in the foregoing description, and values in a reasonable range in accordance with the technology disclosed herein are also included within the scope of the technology disclosed herein.

The technology disclosed herein is applicable to a liquid crystal display device including a liquid crystal panel, particularly, to various mobile terminals such as an Internet terminal like an ATM which is required by a user to limit the visibility so as not to allow other people to see displayed content.

The invention claimed is:

1. A liquid crystal display device comprising:
   a liquid crystal panel of a transmissive-type;
   a first polarizing plate provided on a light incident side of the liquid crystal panel;
   a second polarizing plate provided on a light exit side of the liquid crystal panel; and
   a phase difference member provided in at least one of (i) a position between the liquid crystal panel and the first polarizing plate, and (ii) a position between the liquid crystal panel and the second polarizing plate, the phase difference member having a retardation and being set such that the retardation for such a light path that a display surface of the liquid crystal panel is viewed in a direction at a specific polar angle $\Phi k$ ($0°<\Phi k<90°$) determines a direction in which visibility is limited; and
   in the case where the display surface of the liquid crystal panel is viewed in the direction at the specific polar angle $\Phi k$ ($0°<\Phi k<90°$), a combination of the phase difference member and the liquid crystal panel generates a phase difference of $n\lambda/2+\lambda/4$ (where n is 0, or a positive or negative integer) in total through the light path from entry of light into the liquid crystal display device to exit of the light from the liquid crystal display device.

2. The liquid crystal display device recited in claim 1, wherein:
   the phase difference member is a phase plate having a relationship of nx=ny>nz or nx=ny<nz where nx is a principal refractive index in an x axis direction, ny is a principal refractive index in a y axis direction, and nz is a principal refractive index in a z axis direction, the x axis direction, the y axis direction, and the z axis direction being orthogonal to each other; and
   the phase plate is arranged such that an xy plane of the phase plate, and an absorption axis of the polarizing plate are parallel to each other, the xy plane being related to the principal refractive index nx and the principal refractive index ny.

3. The liquid crystal display device recited in claim 1, wherein:
   the phase difference member is a phase plate having a relationship of nx>ny=nz, nz=nx>ny, nx>ny>nz, nx>nz>ny, or nz>nx>ny where nx is a principal refractive index in an x axis direction, ny is a principal refractive index in a y axis direction, nz is a principal refractive index in a z axis direction, the x axis direction, the y axis direction, the z axis direction being orthogonal to each other; and
   the phase plate is arranged such that either an axis direction of nx or an axis direction of ny is parallel to an absorption axis of the polarizing plate.

4. The liquid crystal display device recited in claim 1, wherein:
   the phase difference member includes a laminate of a plurality of phase plates.

5. The liquid crystal display device recited in claim 4, wherein:
   the phase plates include a first phase plate and a second phase plate;
   in a case where the display surface of the liquid crystal panel is viewed in a direction at a specific first polar angle $\Phi k1$ ($0°<\Phi k<90°$), a combination of the first phase plate, the second phase plate, and the liquid crystal panel generates a first phase difference of $\lambda/2+\lambda/4$ (where n is 0, or a positive or negative integer) through a light path from entry of light into the liquid crystal display device to exit of the light from the liquid crystal display device; and in a case where the display surface of the liquid crystal panel is viewed in a direction at a second polar angle $\Phi k2$ ($0°<\Phi k<90°$), the combination of the first phase plate, the second phase plate, and the liquid crystal panel generates a second phase difference of $n\lambda/2+\lambda/4$ (where n is 0, or a positive or negative integer) through a light path from entry of light into the liquid crystal display device to exit of the light from the liquid crystal display device, which second phase difference is different from the first phase difference.

6. The liquid crystal display device recited in claim 4, wherein:

in a case where the display surface of the liquid crystal panel is viewed in a single direction at a constant specific polar angle ($0°<\Phi k<90°$), a combination of the plurality of phase plates and the liquid crystal panel generates a phase difference of $n\lambda/2+\lambda/4$ (where n is 0, or a positive or negative integer) through a light path from entry of light into the liquid crystal display device to exit of the light from the liquid crystal display device.

7. The liquid crystal display device recited in claim 1, wherein:

an absorption axis of the polarizing plate and a slow axis of the phase difference member are parallel to a top-bottom direction of the display surface or a left-right direction of the display surface in a case where a viewer views information displayed on the display surface of the liquid crystal display device.

8. The liquid crystal display device recited in claim 1, wherein:

an absorption axis of the polarizing plate and a slow axis of the phase difference member are set so that in a case where a viewer views information displayed on the display surface of the liquid crystal display device, the absorption axis is parallel to a top-bottom direction of the display surface, or a left-right direction of the display surface, and the slow axis is perpendicular to the display surface.

* * * * *